US012560741B2

(12) United States Patent
Olvera Carranza et al.

(10) Patent No.: US 12,560,741 B2
(45) Date of Patent: Feb. 24, 2026

(54) SYSTEM AND METHOD TO DEVELOP NATURALLY FRACTURED HYDROCARBON RESERVOIRS USING A FRACTURE DENSITY INDEX

(71) Applicant: Saudi Arabian Oil Company, Dhahran (SA)

(72) Inventors: Karla Patricia Olvera Carranza, Dhahran (SA); Otto Meza Camargo, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 973 days.

(21) Appl. No.: 17/712,820

(22) Filed: Apr. 4, 2022

(65) Prior Publication Data

US 2023/0313649 A1     Oct. 5, 2023

(51) Int. Cl.
| | |
|---|---|
| *G01V 20/00* | (2024.01) |
| *E21B 43/16* | (2006.01) |
| *E21B 43/26* | (2006.01) |

(52) U.S. Cl.
CPC .............. *G01V 20/00* (2024.01); *E21B 43/16* (2013.01); *E21B 43/26* (2013.01);
(Continued)

(58) Field of Classification Search
CPC ............. G01V 20/00; G01V 2210/324; G01V 2210/646; E21B 43/16; E21B 43/26; E21B 49/00; E21B 2200/20
See application file for complete search history.

(56) References Cited

U.S. PATENT DOCUMENTS

| 6,502,037 B1 | 12/2002 | Jorgensen et al. |
| 6,705,398 B2 | 3/2004 | Weng |
| | | (Continued) |

FOREIGN PATENT DOCUMENTS

| AU | 2013374225 B2 | 7/2014 |
| AU | 2018267575 B9 | 12/2018 |
| | (Continued) | |

OTHER PUBLICATIONS

Wickham, J., et al. "Geomechanics of Fracture Density" Unconventional Resources Tech. Conf., URTeC control ID No. 1619745 (2013) (Year: 2013).*

(Continued)

*Primary Examiner* — Jay Hann
(74) *Attorney, Agent, or Firm* — Bracewell LLP; Constance G. Rhebergen; Brian H. Tompkins

(57) ABSTRACT

Hydrocarbon reservoir development that includes determining, based on fracture data, a two-dimensional (2D) fracture model including fracture lines representing locations of fractures in the reservoir, determining, based on the lines, a fracture density index (FDI) map including FDI values for cells representing the reservoir, including, for each cell, determining a FDI value based on proximity to the fracture lines, determining a circulation loss (CL) map including CL values for the cells, including, for each cell, determining a CL value based on proximity of the cell to locations of circulation loss events in the hydrocarbon reservoir, determining, based on the FDI map and the CL map, a correlation of FDI to CL for the reservoir, and drilling a hydrocarbon well based on the correlation.

17 Claims, 9 Drawing Sheets

(52) U.S. Cl.
CPC .... *E21B 2200/20* (2020.05); *G01V 2210/624*
(2013.01); *G01V 2210/646* (2013.01)

(56) References Cited

U.S. PATENT DOCUMENTS

| | | |
|---|---|---|
| 6,904,365 B2 | 6/2005 | Bratton et al. |
| 7,025,138 B2 | 4/2006 | Kurkjian et al. |
| 7,042,802 B2 | 5/2006 | Sinha |
| 7,337,660 B2 | 3/2008 | Ibrahim et al. |
| 7,457,194 B2 | 11/2008 | Prioul et al. |
| 7,526,385 B2 | 4/2009 | Sayers |
| 7,562,278 B2 | 7/2009 | Lyakh et al. |
| 7,565,278 B2 | 7/2009 | Li et al. |
| 7,679,993 B2 | 3/2010 | Sayers |
| 7,707,018 B2 | 4/2010 | Shaw |
| 7,941,307 B2 | 5/2011 | Symington et al. |
| 8,010,294 B2 | 8/2011 | Dorn et al. |
| 8,024,124 B2 | 9/2011 | Sayers |
| 8,041,510 B2 | 10/2011 | Dasgupta |
| 8,078,405 B2 | 12/2011 | Delorme |
| 8,121,792 B2 | 2/2012 | Hsu et al. |
| 8,204,727 B2 | 6/2012 | Dean et al. |
| 8,301,427 B2 | 10/2012 | Souche et al. |
| 8,374,836 B2 | 2/2013 | Yogeswaren |
| 8,498,848 B2 | 7/2013 | Habashy et al. |
| 8,619,500 B2 | 12/2013 | Gray |
| 8,756,016 B2 | 6/2014 | Tabanou et al. |
| 8,780,671 B2 | 7/2014 | Sayers |
| 8,898,046 B2 | 11/2014 | Moos et al. |
| 9,022,140 B2 | 5/2015 | Marx et al. |
| 9,062,545 B2 | 6/2015 | Roberts et al. |
| 9,063,251 B2 | 6/2015 | Moos |
| 9,068,448 B2 | 6/2015 | Hui et al. |
| 9,110,190 B2 | 8/2015 | Yogeswaren |
| 9,152,745 B2 | 10/2015 | Glinsky |
| 9,305,121 B2 | 4/2016 | Yao et al. |
| 9,390,204 B2 | 7/2016 | Bowen et al. |
| 9,417,348 B2 | 8/2016 | Lin |
| 9,435,192 B2 | 9/2016 | Lawrence et al. |
| 9,465,140 B2 | 10/2016 | Crawford et al. |
| 9,618,652 B2 | 4/2017 | Weng et al. |
| 9,677,393 B2 | 6/2017 | Morris |
| 9,846,260 B2 | 12/2017 | Mallet |
| 9,988,895 B2 | 6/2018 | Roussel et al. |
| 10,001,003 B2 | 6/2018 | Dusseault et al. |
| 10,101,498 B2 | 10/2018 | Berard et al. |
| 10,190,406 B2 | 1/2019 | Holland et al. |
| 10,302,785 B2 | 5/2019 | Dirksen et al. |
| 10,310,137 B1 | 6/2019 | Mallet |
| 10,352,145 B2 | 7/2019 | Maxwell et al. |
| 10,422,208 B2 | 9/2019 | Weng et al. |
| 10,465,509 B2 | 11/2019 | Yao et al. |
| 10,528,681 B2 | 1/2020 | Yogeswaren |
| 10,563,493 B2 | 2/2020 | Ganguly et al. |
| 10,571,605 B2 | 2/2020 | Crawford et al. |
| 10,572,611 B2 | 2/2020 | Huang et al. |
| 10,607,043 B2 | 3/2020 | Camargo et al. |
| 10,724,346 B2 | 7/2020 | Eftekhari Far et al. |
| 10,760,416 B2 | 9/2020 | Weng et al. |
| 10,787,887 B2 | 9/2020 | Pankaj et al. |
| 10,846,447 B2 | 11/2020 | Myers et al. |
| 10,853,533 B2 | 12/2020 | Plateaux et al. |
| 10,920,538 B2 | 2/2021 | Rodriguez Herrera et al. |
| 10,920,552 B2 | 2/2021 | Rodriguez Herrera et al. |
| 11,098,582 B1 | 8/2021 | Camargo et al. |
| 11,180,975 B2 | 11/2021 | Renaudeau et al. |
| 11,313,994 B2 | 4/2022 | Salman et al. |
| 11,434,759 B2 | 9/2022 | Awan et al. |
| 11,599,790 B2 | 3/2023 | Pandey et al. |
| 11,834,931 B2 * | 12/2023 | Guillot ................... E21B 41/00 |
| 2007/0100594 A1 | 5/2007 | Lamoureux-Var et al. |
| 2007/0255545 A1 | 11/2007 | Pita et al. |
| 2007/0272407 A1 | 11/2007 | Lehnman et al. |
| 2008/0071505 A1 | 3/2008 | Huang et al. |
| 2009/0319243 A1 | 12/2009 | Suarez-Rivera et al. |

| | | |
|---|---|---|
| 2010/0191470 A1 | 7/2010 | Tabanou et al. |
| 2010/0250216 A1 | 9/2010 | Narr et al. |
| 2012/0072188 A1 | 3/2012 | Maerten et al. |
| 2013/0046524 A1 | 2/2013 | Gathogo et al. |
| 2013/0054207 A1 * | 2/2013 | Souche ................... G06F 30/28 703/2 |
| 2013/0297269 A1 | 11/2013 | Davies et al. |
| 2013/0299241 A1 | 11/2013 | Alberty et al. |
| 2014/0358510 A1 | 12/2014 | Sarkar et al. |
| 2015/0129211 A1 | 5/2015 | Dusseault et al. |
| 2015/0276979 A1 | 10/2015 | Hugot et al. |
| 2016/0222765 A1 | 8/2016 | Nooruddin et al. |
| 2016/0245939 A1 | 8/2016 | Williams |
| 2016/0266274 A1 | 9/2016 | Alqam et al. |
| 2016/0266278 A1 | 9/2016 | Holderby et al. |
| 2016/0281498 A1 | 9/2016 | Nguyen et al. |
| 2017/0051598 A1 | 2/2017 | Ouenes |
| 2017/0132339 A1 | 5/2017 | Umholtz et al. |
| 2017/0145793 A1 | 5/2017 | Ouenes |
| 2017/0176228 A1 | 6/2017 | Elisabeth |
| 2017/0205531 A1 | 7/2017 | Berard et al. |
| 2017/0254909 A1 | 9/2017 | Agharazi |
| 2017/0316128 A1 | 11/2017 | Huang et al. |
| 2018/0203146 A1 | 7/2018 | Den Boer et al. |
| 2019/0080122 A1 | 3/2019 | Camargo et al. |
| 2019/0345815 A1 | 11/2019 | Mishra |
| 2020/0056460 A1 | 2/2020 | Isaev et al. |
| 2020/0095858 A1 | 3/2020 | Bouaouaja et al. |
| 2020/0141215 A1 | 5/2020 | Crews et al. |
| 2020/0225382 A1 | 7/2020 | Mallet et al. |
| 2020/0225383 A1 | 7/2020 | Mallet et al. |
| 2020/0326322 A1 | 10/2020 | Farrukh Hamza |
| 2021/0054736 A1 | 2/2021 | Moos et al. |
| 2021/0102461 A1 | 4/2021 | Kumar et al. |
| 2021/0132246 A1 | 5/2021 | Liu et al. |
| 2021/0140313 A1 | 5/2021 | Busetti |
| 2021/0222518 A1 | 7/2021 | Bardy et al. |
| 2021/0350052 A1 | 11/2021 | Alwahtani et al. |
| 2022/0018245 A1 | 1/2022 | Coenen |
| 2022/0291418 A1 | 9/2022 | Noufal |
| 2023/0012429 A1 | 1/2023 | Camargo et al. |
| 2023/0084141 A1 | 3/2023 | Camargo et al. |
| 2023/0333278 A1 | 10/2023 | Camargo et al. |

FOREIGN PATENT DOCUMENTS

| | | |
|---|---|---|
| BR | PI1003737 A2 | 3/2012 |
| CA | 2778313 A1 | 6/2011 |
| CA | 2904008 A1 | 9/2014 |
| CA | 2932670 A1 | 12/2017 |
| CA | 3043231 A1 | 6/2018 |
| CN | 102042010 B | 1/2014 |
| CN | 102788994 B | 1/2015 |
| CN | 104459775 B | 3/2015 |
| CN | 104500050 A | 5/2015 |
| CN | 105403929 A | 3/2016 |
| CN | 105484741 A | 4/2016 |
| CN | 103064114 B | 5/2016 |
| CN | 106285659 A | 1/2017 |
| CN | 104992468 B | 1/2018 |
| CN | 105134156 B | 5/2018 |
| CN | 108331555 A | 7/2018 |
| CN | 107578343 B | 7/2020 |
| CN | 107577831 B | 8/2020 |
| CN | 110850057 B | 4/2021 |
| CN | 112253103 B | 8/2021 |
| CN | 112065351 B | 9/2021 |
| CN | 113534291 A | 10/2021 |
| CN | 109102180 B | 11/2021 |
| CN | 112526107 B | 11/2021 |
| CN | 109388817 B | 2/2022 |
| CN | 114153002 A | 3/2022 |
| CN | 115166853 A | 10/2022 |
| EP | 3118758 A1 | 1/2017 |
| EP | 2179134 B1 | 1/2018 |
| EP | 3074957 B1 | 2/2022 |
| EP | 4042211 | 8/2022 |
| FR | 2979016 A | 2/2013 |
| KR | 101620506 B1 | 5/2016 |

(56)                    References Cited

FOREIGN PATENT DOCUMENTS

| KR | 102111207 B1 | 5/2020 |
|---|---|---|
| RU | 2404359 C2 | 11/2010 |
| WO | 2010111398 A2 | 9/2010 |
| WO | 2013169256 A1 | 11/2013 |
| WO | 2015168417 A1 | 11/2015 |
| WO | 2016122792 A1 | 8/2016 |
| WO | 2016198894 A2 | 12/2016 |
| WO | 2016209822 A1 | 12/2016 |
| WO | 2017019388 A1 | 2/2017 |
| WO | 2017216594 A1 | 12/2017 |
| WO | 2019238451 A1 | 12/2019 |
| WO | 2020167282 A1 | 8/2020 |
| WO | 2020198210 A1 | 10/2020 |
| WO | 2021108439 A1 | 6/2021 |
| WO | 2021236877 A1 | 11/2021 |
| WO | 2023130074 A1 | 7/2023 |

OTHER PUBLICATIONS

Al-Nutaifi, A.M., et al. "Wellbore Instability Analysis for Highly Fractured Carbonate Gas Reservoir from Geomechanics Prospective, Saudi Arabia Case Study" Int'l Petroleum Tech. Conf. (2014) (Year: 2014).*

Zastoupil, L.B. "A Geomechanical Equation for Fracture Density/ Brittleness and Comparisons with a Mineralogical Brittleness Index" Masters Thesis, U. Texas at Arlington (2015) (Year: 2015).*

Wehunt, D. "Stochastic 2D Well Path Assessments for Naturally Fractured Carbonate Reservoirs" Society of Petroleum Engineers, SPE-180468-MS (2016) (Year: 2016).*

Maucec, M., et al. "New Approach to History Matching of Simulation Models with Discrete Fracture Networks" Int'l Petroleum Tech. Conf. (2020) (Year: 2020).*

Fischer, K. et al.; "Generating and Calibrating 3D Geomechanical Reservoir Models" 75th EAGE Conference and Exhibition incorporating SPE EUROPEC 2013, London UK, Jun. 10-13, 2013; pp. 1-5.

Ahmadi, Mohammad Ali; "Toward Reliable Model for Prediction Drilling Fluid Density at Wellbore Conditions: A LSSVM Model" Neurocomputing, vol. 211, Oct. 26, 2016; pp. 143-149.

Aksenov, A.A. et al.; "Prediction of Distribution of Hydrogen Sulfide in Oil-Gas Basins" Petroleum Geology: A digest of Russian literature on Petroleum Geology; vol. 16 (1979), No. 10 (October); pp. 439-441.

Al-Hawas, Khalid et al.; Delineation of fracture anisotropy signatures in Wudayhi Field by azimuthal seismic data; The Leading Edge, Interpreter's Corner, Dec. 2003; pp. 1202-1211.

Aldrich, Jeffrey B. et al.; "'Sweet Spot' Identification and Optimization in Unconventional Reservoirs" Search and Discovery Article #80644 (2018); pp. 1-6.

ArcGIS; "How Kernel Density works" available as of Jan. 28, 22 at: https://desktop.arcgis.com/en/arcmap/10.6/tools/spatial-analyst-toolbox/how-kernel-density-works.htm; pp. 1-3.

ArcGIS Pro 2.8; "An overview of the Density toolset" available as of Apr. 4, 2022 at: https://pro.arcgis.com/en/pro-app/2.8/tool-reference/ spatial-analyst/an-overview-of-the-density-tools.htm; p. 1.

ArcGIS Pro 2.8; "How Kernel Density Works" Available as of Mar. 14, 2022 at: https://pro.arcgis.com/en/pro-app/2.8/tool-reference/ spatial-analyst/how-kernel-density-works.htm; pp. 1-6.

ArcGIS Pro 2.8; "Kernel Density (Spatial Analyst)" available as of Mar. 14, 2022 at: https://pro.arcgis.com/en/pro-app/2.8/tool-reference/ spatial-analyst/kernel-density.htm; pp. 1-5.

ArcGIS Pro 2.8; "Line Density (Spatial Analyst)" available as of Apr. 4, 2022 at: https://pro.arcgis.com/en/pro-app/2.8/tool-reference/ spatial-analyst/line-density.htm; pp. 1-6.

ArcGIS Pro 2.8; "Point Density (Spatial Analyst)" available as of Apr. 4, 2022 at: https://pro.arcgis.com/en/pro-app/2.8/tool-reference/ spatial-analyst/point-density.htm; pp. 1-7.

Barton, Colleen A. et al.; "Fluid flow along potentially active faults in crystalline rock" Geology; Aug. 1995; v.23; No. 8; pp. 683-686.

Bisdom, Kevin et al.; "A geometrically based method for predicting stress-induced fracture aperture and flow in discrete fracture networks" AAPG Bulletin v. 100, No. 7 (Jul. 2016); pp. 1075-1097.

Bisdom, Kevin et al.; "The impact of in-situ stress and outcrop-based fracture geometry on hydraulic aperture and upscaled permeability in fractured reservoirs" (abstract only) Tectonphysics v. 690, Part A, Oct. 28, 2010; pp. 63-75.

Camargo, Otto E. Meza et al.; "Reservoir Stress Path from 4D Coupled High Resolution Geomechanics Model: A Case Study for Jauf Formation, North Ghawar, Saudi Arabia" Saudi Aramco Journal of Technology, Fall 2016; pp. 45-59.

Cao, Yang-Bing et al.; "Calculation Method and Distribution Characteristics of Fracture Hydraulic Aperture from Field Experiments in Fractured Granite Area" (abstract only), Springer Ling, Nov. 9, 2015; pp. 1-18.

Cappa, F. et al.; "Estimation of fracture flow parameters through numerical analysis of hydromechanical pressure pulses" Water Resources Research, American Geophysical Union, 2008, 44, pp. W11408; pp. 1-49.

Chen, Sheng et al.; "Prediction of sweet spots in shale reservoir based on geophysical well logging and 3D seismic data" Energy Exploration & Exploitation, vol. 35(2), 2017; pp. 147-171.

Engelder, Terry et al.; "Chapter 15: A Pore-Pressure Limit in Overpressured South Texas Oil and Gas Fields" pp. 255-267, AAPG Memoir 67, 1997; pp. 255-267.

Fischer, K. et al.; "A workflow for building and calibrating 3-D geomechoanical models—a case study for a gas reservoir in the North German Basin" Solid Earth, 4, (2013); pp. 347-355.

Gan, Quan et al.; "A continuum model for coupled stress and fluid flow in discrete fracture networks" Geomech. Geophys. Geo-energ. Geo-resour. (2016); pp. 2:43-61.

Gray, F. David et al.; "Fracture detection in the Manderson Field: A 3D AVAZ case history" Society of Exploration Geophysicists, Jan. 5, 2005; pp. 1-4.

Herwanger, J., Seismic Geomechanics, How to Build and Calibrate Geomechanical Models using 3D and 4D Seismic Data, 1 Edn., EAGE Publications b.v. Houten, 2011; Chapter 2, pp. 19-39, Chapter 6, pp. 102-118.

International Search Report and Written Opinion for International Application No. PCT/US2018/046824 (SA5707) report mail date Nov. 28, 2018; pp. 1-13.

International Search Report and Written Opinion for International Application No. PCT/US2020/062069 (SA51044), report mail date Mar. 11, 2021; pp. 1-18.

International Search Report and Written Opinion for International Application No. PCT/US2021/018379 (SA51284) report mail date May 28, 2021; pp. 1-16.

Jorgensen, Bo Barker et al.; "Bacterial Sulfate Reduction Above 100C in Deep-Sea Hydrothermal Vent Sediments" (Abstract only) Science, vol. 258, Issue 5089, Dec. 11, 1992; pp. 1756-1757.

Khadivi, Kourosh et al.; "Integrated fracture characterization of Asmari reservoir in Haftkel field" Journal of Petroleum Exploration and Production Technology, Jan. 4, 2022; pp. 1-21.

Koutsabeloulis, N.C. et al.; "Numerical geomechanics in reservoir engineering" Computer Methods and Advances in Geomechanics, A.A. Balkema, Rotterdam, The Netherlands, 1994; pp. 2097-2104.

Lei, Qinghua et al.; "The use of discrete fracture networks for modelling coupled geomechanical and hydrological behaviour of fracture rocks" Computers and Geotechnics 85 (2017); pp. 151-176.

Liu, Naizhen et al.; "Shale gas sweet spot identification and precise geo-steering drilling in Weiyuan Block of Sichuan Basin, SW China" Petroleum Exploration and Development, vol. 43, Issue 6, Dec. 2016; pp. 1-9.

Luthi, S.M. et al.; "Fracture apertures from electrical borehole scans" Geophysics, vol. 55, No. 7 (Jul. 1990); pp. 821-833.

Maerten, F.; "Adaptive cross-approximation applied to the solution of system of equations and post-Processing for 3D elastostatic problems using the boundary element Method" Engineering Analysis with Boundary Elements 34, 2010; pp. 483-491.

Matyasik, Irena et al.; "Genesis of hydrogen sulfide in carbonate reservoirs" Nafta-Gaz, Rok LXXIV, Nr Sep. 2018; pp. 627-635.

(56) References Cited

OTHER PUBLICATIONS

Min, Ki-Bok et al.; "Stress-Dependent Permeability of Fractured Rock Masses: A Numerical Study" International Journal of Rock Mechanics and Mining Sciences, vol. 41, Issue 7 (2004); pp. 1191-1210.

Nejadi, Siavash et al.; "History matching and uncertainty quantification of discrete fracture network models in fractured reservoirs" Journal of Petroleum Science and Engineering 152 (2017); pp. 21-32.

Orr, Wilson L.; "Changes in Sulfur Content and Isotopic Ratios of Sulfur during Petroleum Maturation—Study of Big Horn Basin Paleozoic Oils" The American Association of Petroleum Geologists Bulletin, V. 58, No. 11 (Nov. 1974); pp. 2295-2318.

Rogers S. et al, "Integrating discrete fracture network models and pressure transient data for testing conceptual fracture models of the Valhall chalk reservoir, Norway North Sea"; Geological Society, London, Special Publications, 270, 2007, pp. 187-197.

Rogers, Stephen F.; "Critical stress-related permeability in fractured rocks", Chpt 2, Fracture and In-Situ Stress Characterization of Hydrocarbon Reservoirs, (AMEEN) Geoscience World, The Geological Society of London, Jan. 1, 2003; pp. 7-16.

Schlumberger; "Welcome to Techlog online help Feb. 2018" 2018; pp. 1-2.

Silverman, B.W.; "Density Estimation For Statistics and Data Analysis" Monographs on Statistics and Applied Probability, London: Chapman and Hall, 1986; pp. 1-22.

Sorkhabi, Rasoul, Ph.D.; "Locating Sweet Spots: Shale Petroleum Systems" available as of Dec. 28, 2021 at: https://www.geoexpro.com/articles/2020/06/locating-sweet-spots-shale-petroleum-systems; vol. 17, No. 2—2020; pp. 1-10.

Tokhmchi, Behzad et al.; "Estimation of the fracture density in fractured zones using petrophysical logs" Journal of Petroleum Science and Engineering 72 (2010); pp. 206-213.

U.S. Appl. No. 17/463,153 (SA51648) titled "Determining Hydrogen Sulfide (H2S) Concentration and Distribution in Carbonate Reservoirs Using Geomechanical Properties" filed Aug. 31, 2021.

U.S. Appl. No. 17/476,914 (SA51643) titled "Identifying Fluid Flow Paths in Naturally Fractured Reservoirs" filed Sep. 16, 2021.

U.S. Appl. No. 17/690,484 (SA51689) titled "Geo-Mechanical Based Determination of Sweet Spot Intervals for Hydraulic Fracturing Stimulation" filed Mar. 9, 2022.

Wikipedia; "Kernel density estimation" available as of Apr. 4, 22 at: https://en.wikipedia.org/wiki/Kernel_density_estimation#:~:text= In statistics%2C kernel density estimation,on a finite data sample; pp. 1-12.

Worden, R.H. et al.; "Gas Souring by Thermochemical Sulfate Reduction by 140C1" The American Association of Petroleum Geologists Bulletin, V. 79, No. 6 (Jun. 1995); pp. 854-863.

Worden, Richard H. et al.; "Origin of H2S in Khuff Reservoirs by Thermochanical Sulfate Reduction: Evidence from Fluid Inclusions" Saudi Aramco Journal of Technology, Fall 2004; pp. 42-52.

Zellou, Abdel et al.; "Fractured Reservoir Characterization Using Post-Stack Seismic Attributes: Application to a Hungarian Reservoir", EAGE 68th Conference & Exhibition—Vienna, Austria, Jun. 12-15, 2006; pp. 1-4.

Zhu, GuangYou et al.; "The controlling factors and distribution prediction of H2S formation in marine carbonate gas reservoir, China" (abstract only) Chinese Science Bulletin, vol. 52 (2007), pp. 150-163.

Zoback, Mark D.; "Chapter 11: Critically stressed faults and fluid flow" Reservoir Geomechanics, Cambridge University Press, New York, 2007, pp. 1-21.

Ge, Jun et al.; "Semianalytical modeling on 3D stress redistribution during hydraulic fracturing stimulation and its effects on natural fracture reactivation" Int J Numer Anal Methods Geomech. (2020) / V. 44, / 8; pp. 1184-1199.

Huang, Jian et al.; "Natural-hydraulic fracture interaction: Microseismic observations and geomechanical predictions" (abstract only) Interpretation (2015) 3 (3); pp. SU17-SU31.

Kayode, B. et al.; "Advances in Reservoir Modeling: A New Approach for Building Robust Reservoir Models" (abstract only) SPE-187993-MS, SPE KSA Annual Technical Symposium and Exhibition, Dammam, Saudi Arabia, Apr. 2017; pp. 1-6.

Meza, O. et al.; "Integration of Borehole Image Logs and Rock Mechanics for Critically Stressed Fractures Analysis in Weak Carbonates" (abstract only) 2nd EAGE Borehole Geology Workshop, Oct. 2017, vol. 2017; pp. 1-5.

Ochie, Karen Ifeoma et al.; "Geostatistics—Kriging and Co-Kriging Methods in Reservoir Characterization of Hydrocarbon Rock Deposits" SPE-193483-MS, Nigeria Annual International Conference & Exhibition, Lagos, Nigeria, Aug. 6-8, 2018; pp. 1-11.

Zeng, Qingdong et al.; "Numerical Simulation of Fluid-Solid Coupling in Fractured Porous Media with Discrete Fracture Model and Extended Finite Element Method" Computation (2015), 3; pp. 541-557.

Alcantara, Ricardo et al.; "A Dynamic Characterization Approach for a Complex Naturally Fractured Reservoir" International Petroleum Technology Conference, Beijing, China, Mar. 26-28, 2019; pp. 1-40.

ArcGIS; "How Line Density works" available as of Jan. 18, 2022 at: https://desktop.arcgis.com/en/arcmap/10.6/tools/spatial-analyst-toolbox/how-line-density-works.htm; pp. 1-3.

Jiang, Le et al.; "Simulation and Optimization of Dynamic Fracture Parameters for an Inverted Square Nine-Spot Well Pattern in Tight Fractured Oil Reservoirs" Hindawi, Geofluids, vol. 2020, Article ID 8883803; pp. 1-9.

Liu, Shiqi et al.; "Geological and Engineering Integrated Shale Gas Sweet Spots Evaluation Based on Fuzzy Comprehensive Evaluation Method: A Case Study of Z Shale Gas Field HB Block" Energies 2022, 15, 602, Jan. 14, 2022; pp. 1-20.

Ouenes, Ahmed; "Stress Modeling '3-G' Workflow Pinpoints Shale Sweet Spots" The American Oil & Gas Reporter, Jul. 2015; pp. 1-3.

U.S. Appl. No. 17/721,064 (SA51697) titled "Identifying Naturally Fractured Sweet Spots Using a Fracture Density Index (FDI)" filed Apr. 14, 2022.

Zoback, Mark D.; "Critically stressed faults and fluid flow" Reservoir Geomechanics Chapter 11; Cambridge University Press (2007); pp. 1-20.

Akhmetova, A.A. et al.; "Evaluation of the applicability minifracturing data to determine reservoir pressure and transmissibility (Russian)." OIJ 2018 (2018); pp. 90-94.

Azari, Mehdi et al.; "Determining the Formation Properties with Innovative Formation Integrity Test Designed Using a Wireline Straddle Packer, A Field Example" SPWLA 59th Annual Logging Symposium, Jun. 2-6, 2018; pp. 1-12.

Blakely, Richard J.; "Potential Theory in Gravity and Magnetic Applications" Cambridge University Press, 1996; pp. 1-9.

Ferreira, Francisco J.F. et al.; "Enhancement of the total horizontal gradient of magnetic anomalies using the tilt angle" Geophysics vol. 78, No. 3 (May-Jun. 2013); pp. J33-J41.

Friedman, Jerome H.; "Greedy Function Approximation: A Gradient Boosting Machine" 1999 Reitz Lecture, The Annals of Statistics (2001), vol. 29, No. 5; pp. 1189-1232.

Gunn, P.J.; "Linear Transformations of Gravity and Magnetic Fields" Geophysical Prospecting vol. 23, Issue 2, Jun. 1974; pp. 300-312.

Han, Jiahang et al.; "Stress Field Change Due to Reservoir Depletion and Its Impact on Refrac Treatment Design and SRV in Unconventional Reservoirs" SPE-178496-MS/URTeC:2144941; Unconventional Resources Tech. Conf., Texas, Jul. 20-22, 2015; pp. 1-11.

Jacquemyn, Carl et al.; "Mechanical stratigraphy and (paleo-) karstification of the Murge area (Apulia, southern Italy)" (abstract only) Geological Society, London, Special Publicationsvol. 370; pp. 169-186.

Miller, Hugh G. et al.; "Potential field tilt—a new concept for location of potential field sources" Journal of Applied Geophysics 32 (1994); pp. 213-217.

Mojeddifar, Saeed et al.; "Porosity prediction from seismic inversion of a similarity attribute based on a pseudo-forward equation (PFE): a case study from the North Sea Basin, Netherlands" Pet. Sci. (2015) 12; pp. 428-442.

(56) References Cited

OTHER PUBLICATIONS

Nolte, K.G. et al.; "After-Closure Analysis of Fracture Calibration Tests" SPE 38676, 1997 SPE Annual Technical Conference and Exhibition, San Antonio, TX, Oct. 5-8, 1997; pp. 333-349.

Phillips, Jeffrey D.; "Designing matched bandpass and azimuthal filters for the separation of potential-field anomalies by source region and source type" ASEG 15th Geophysical Conference and Exhibition, Aug. 2001, Brisbane; pp. 1-4.

Rezmer-Cooper, Iain M. et al.; "Real-Time Formation Integrity Tests Using Downhole Data" IADC/SPE 59123, 2000 IASC/SPE Drilling Conference, New Orleans, LA, Feb. 23-25, 2000; pp. 1-12.

Schultz, Ryan et al.; "The Cardston Earthquake Swarm and Hydraulic Fracturing of the Exshaw Formation (Alberta Bakken Play)" Bulletin of the Seismological Society of America, vol. 105, No. 6, Dec. 2015; pp. 1-14.

Spector, A. et al.; "Statistical Models for Interpreting Aeromagnetic Data" Geophysics, vol. 35, No. 2, Apr. 1970; pp. 293-302.

Tian, Fei et al.; "Three-Dimensional Geophysical Characterization of Deeply Buried Paleokarst System in the Tahe Oilfield, Tarim Basin, China" Water (2019) 11, 1045; pp. 1-18.

Van Lanen, Xavier et al.; "Integrated geologic and geophysical studies of North American continental intraplate seismicity" The Geological Society of America, Special Paper 425, 2007; pp. 101-112.

Wilson, Adam; "Common Mistakes Associated with Diagnostic Fracture Injection Tests" Journal of Petroleum Technology, Aug. 31, 2014; pp. 1-6.

Wynants-Morel, Nicolas et al.; "Stress Perturbation From Aseismic Slip Drives the Seismic Front During Fluid Injection in a Permeable Fault" JGR Solid Earth vol. 125, Issue 7, Jul. 2020; pp. 1-23.

Barree, R.D. et al.; "Holistic Fracture Diagnostics" SPE 107877, Rocky Mountain Oil & Gas Technology Symposium, Denver, CO, Apr. 16-18, 2007; pp. 1-13.

Palamakumbura, Romesh et al.; "A review and evaluation of the methodology for digitising 2D fracture networks and topographic lineaments in GIS" Solid Earth Discussions; Preprint. Discussion started: Dec. 10, 2019; pp. 1-21.

Zhang, Jing et al.; "Statistical analysis of geological factors controlling bed-bounded fracture density in heterolithic shale reservoirs: The example of the Woodford Shale Formation (OK, USA)" J. of Petroleum Science & Engineering 200 (2021); pp. 1-12.

* cited by examiner

700

800

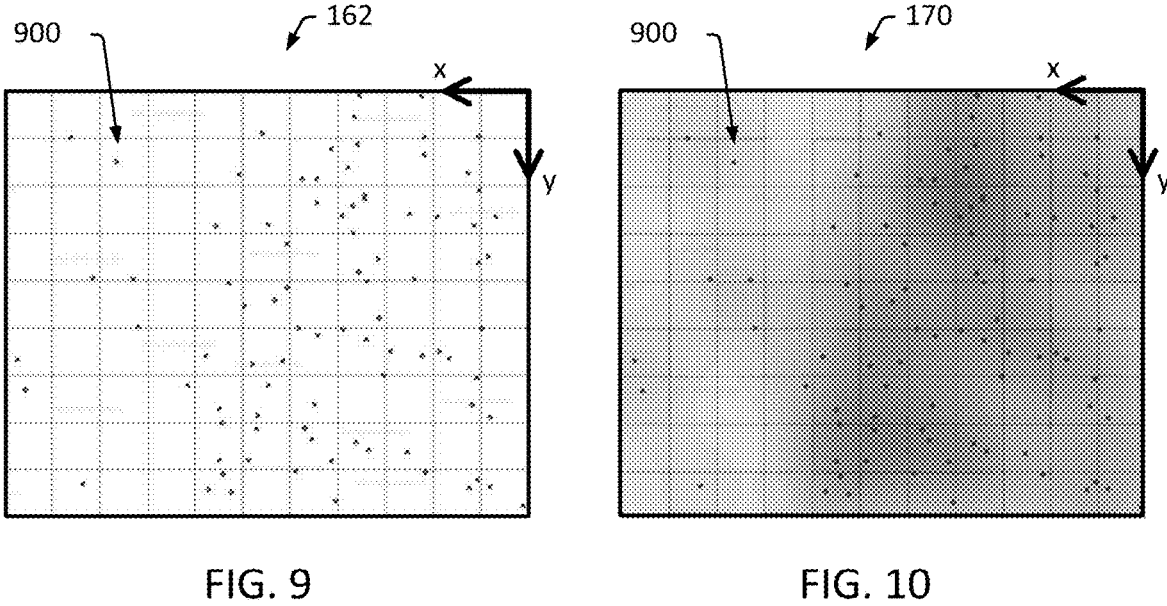
FIG. 9                    FIG. 10
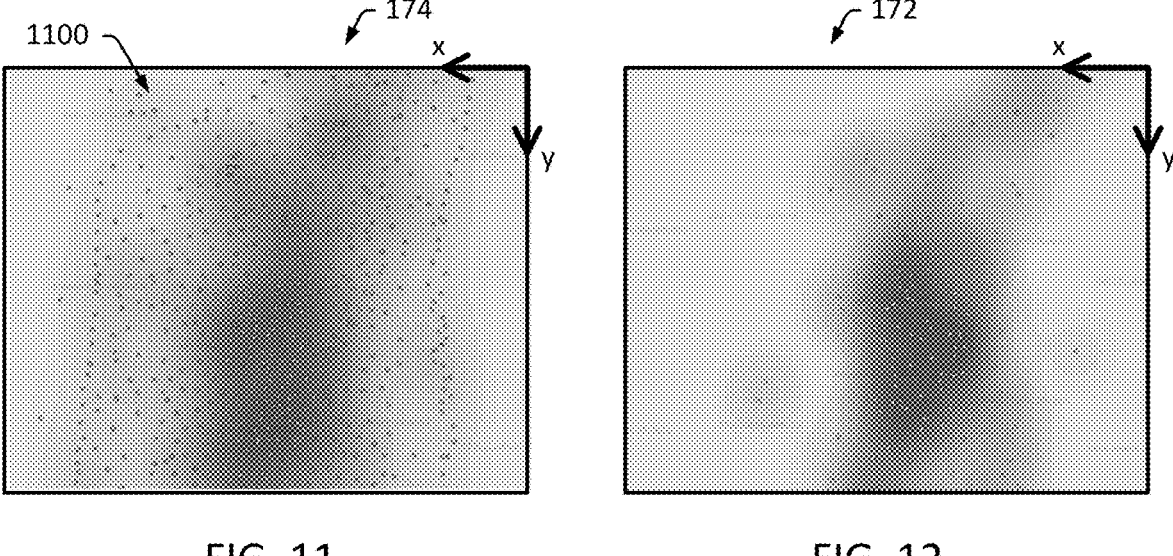
FIG. 11                   FIG. 12

SYSTEM AND METHOD TO DEVELOP NATURALLY FRACTURED HYDROCARBON RESERVOIRS USING A FRACTURE DENSITY INDEX

FIELD

Embodiments relate generally to developing hydrocarbon reservoirs and more particularly to locating and drilling wells based on assessment and modeling of hydrocarbon reservoir natural fractures.

BACKGROUND

A rock formation that resides under the Earth's surface is often referred to as a "subsurface" formation. A subsurface formation that contains a subsurface pool of hydrocarbons, such as oil and gas, is often referred to as a "hydrocarbon reservoir." Hydrocarbons are typically extracted (or "produced") from a hydrocarbon reservoir by way of a hydrocarbon well. A hydrocarbon well normally includes a wellbore (or "borehole") that is drilled into the reservoir. For example, a hydrocarbon well may include a wellbore that extends into the rock of a reservoir to facilitate the extraction (or "production") of hydrocarbons from the reservoir, the injection of fluids into the reservoir, or the evaluation and monitoring of the reservoir.

Development of a hydrocarbon reservoir typically involves a series of operations directed to optimizing extraction of hydrocarbons from the reservoir. For example, a reservoir operator may spend a great deal of time and effort assessing a hydrocarbon reservoir to identify an economical and environmentally responsible plan to extract hydrocarbons from the reservoir and may engage in well drilling and production operations to extract hydrocarbons from the reservoir in accordance with the plan. This can include identifying characteristics of reservoir rock, determining where hydrocarbons are located in the reservoir rock, determining where wells should be drilled, generating a field development plan (FDP) that outlines parameters for extracting hydrocarbons from the reservoir, and drilling and operating wells in accordance with the parameters of the FDP. An FDP for a hydrocarbon reservoir may, for example, specify locations, trajectories or operational parameters for wells in the reservoir.

SUMMARY

Reservoir models can be an important aspect of developing a hydrocarbon reservoir. In many instances, successful development of a hydrocarbon reservoir relies on generation of models that accurately reflect characteristics of the reservoir. For example, a reservoir operator may use a model of hydrocarbon reservoir rock fractures or a model of drilling mud circulation losses to predict where drilling mud circulation losses are most likely to occur in the reservoir. The operator may use that knowledge to generate a corresponding field development plan (FDP) that outlines procedures for extracting hydrocarbons from the reservoir, including well parameters (e.g., well locations, trajectories and operating parameters) to help avoid circulation losses and other costly drilling hazards, and may drill and operate wells in accordance with the parameters of the FDP.

Potential drilling hazards are key considerations in the planning of a new well. One of the most recurrent hazards in fractured reservoirs is mud circulation losses while drilling. In many cases, highly fractured zones of formation rock are responsible of losing significant volumes of drilling mud, which can be costly and damage the formation. Unfortunately, predicting the location and extent of fractured zones in naturally fractured reservoirs can be difficult given the heterogeneous nature of natural fractures.

Provided are embodiments for predicting the location and extent of fractured zones in naturally fractured reservoirs, which can be used as a basis for developing a hydrocarbon reservoir. In some embodiments, a fracture density index (FDI) model is generated that provides correlations of reservoir fracture density and associated locations of circulation losses. The FDI model may, for example, define a relationship between FDI and circulation loss values and provide a graphical representation of FDI values and locations of circulation losses across an area of a hydrocarbon reservoir. In some embodiments, an FDI model is used to determine locations for drilling wells in the reservoir. For example, a well location may be selected based on a FDI model indicating that the location has a relatively low fracture density and is located relatively long distance from circulation losses, and well may be drilled at the well location.

In some embodiments, generation and use of a FDI model includes the following: (1) determining, based on fracture data for the reservoir, a three-dimensional (3D) fracture model including planes (e.g., extending vertically, in the z-axis) representing natural fractures within formation rock of a hydrocarbon reservoir (e.g., using geomechanics-based techniques, such as those described in U.S. Pat. No. 10,607,043); (2) determining a two-dimensional (2D) fracture model having lines (e.g., extending horizontally, in the x-y plane) corresponding to the planes of the 3D fracture model; (3) determining a FDI map based on the 2D fracture lines, including FDI values for a 2D set of cells (or "grid of cells") representing an area of the reservoir (e.g., determined using a kernel or line density technique for line features that assigns values to cell based on their proximity to the fracture lines); (4) determining, based on circulation loss data for the reservoir, a circulation loss (CL) model including points (e.g., x-y coordinates) corresponding to locations of observed drilling mud circulation losses of wells drilled into the reservoir; (5) determining, based on the points of the CL model, a "normalized" CL map including normalized circulation loss (CL) density values for the 2D set of cells representing the area of the reservoir (e.g., determined using a kernel density technique for point features that assigns values to cells based on their proximity to the points of the CL model); (6) generating, based on respective sets of the FDI values and CL density values for the respective cells of the 2D set of cells, a correlation of the FDI and CL values of the cells (e.g., a linear relationship based on a fitting of a line to a scatter plot of the FDI-CL values pairs for the 2D set of cells); and (7) generating a FDI model that presents (e.g., graphically) the FDI map and the CL locations integrated with one another, and the correlation of the cell FDI and CL values. As described, the FDI model may be employed as a basis to generate an FDP that specifies reservoir development parameters, such as locations, trajectories or operational parameters for hydrocarbon wells that in the reservoir. An operator may locate, drill or operate wells in accordance with the parameters of the FDP. For example, a well operator may select a well location based on the FDI model indicating that the location has a relatively low fracture density (e.g., below a FDI value threshold) and is located relatively long distance from circulation losses (e.g., more than a threshold distance from the location of an observed circulation loss event), and control drilling of a well at the well location.

Provided in some embodiments is a method of developing a hydrocarbon reservoir that includes the following: determining, based on fracture data for the hydrocarbon reservoir, a 2D fracture model including fracture lines representing locations of fractures in formation rock of the hydrocarbon reservoir; determining, based on the lines of the 2D fracture model, a FDI map including FDI values for cells of a 2D grid of cells representing the hydrocarbon reservoir, the determining of the FDI map including, for each cell of the grid of cells, determining a FDI value for the cell based on a proximity of the cell to the location of the fracture lines; determining a CL map including circulation loss values for the cells of the grid of cells representing the hydrocarbon reservoir, the determining of the circulation loss map including, for each cell of the grid of cells, determining a CL value for the cell based on a proximity of the cell to locations of circulation loss events in the hydrocarbon reservoir; determining, based on the FDI map and the CL map, a correlation of fracture density index value to circulation loss values for the hydrocarbon reservoir; determining, based on the correlation, a location of a hydrocarbon well to be drilled; and drilling the hydrocarbon well at the location.

In some embodiments, the fracture lines of the 2D fracture model correspond to fracture planes of a 3D fracture model that represent natural fractures in the formation rock of the hydrocarbon reservoir. In some embodiments, the FDI values for the cells are determined by way of a kernel density method. In certain embodiments, the FDI values for the cells are determined by way of a line density method. In some embodiments, the method further including determining a 2D circulation loss model including circulation loss points representing locations of circulation loss events observed during drilling of wells in the hydrocarbon reservoir, where the CL values for each of the cell is determined based on a proximity of the cells to the circulation loss points. In some embodiments, determining the correlation of fracture density index to circulation losses includes fitting a line to a plot of FDI-CL value pairs for respective cells of the 2D grid of cells representing the hydrocarbon reservoir, where the correlation is defined by the line. In certain embodiments, the method further including generating a FDI model indicating FDI values across the area of the reservoir corresponding to the grid of cells and locations of circulation loss events observed during drilling of wells in the hydrocarbon reservoir, where the location of the well to be drilled is determined based on the FDI model.

Provided in some embodiments is a non-transitory computer readable storage medium including program instructions stored thereon that are executable by a processor to perform the following operations for developing a hydrocarbon reservoir: determining, based on fracture data for the hydrocarbon reservoir, a 2D fracture model including fracture lines representing locations of fractures in formation rock of the hydrocarbon reservoir; determining, based on the lines of the 2D fracture model, a FDI map including FDI values for cells of a 2D grid of cells representing the hydrocarbon reservoir, the determining of the FDI map including, for each cell of the grid of cells, determining a FDI value for the cell based on a proximity of the cell to the location of the fracture lines; determining a CL map including circulation loss values for the cells of the grid of cells representing the hydrocarbon reservoir, the determining of the circulation loss map including, for each cell of the grid of cells, determining a CL value for the cell based on a proximity of the cell to locations of circulation loss events in the hydrocarbon reservoir; determining, based on the FDI map and the CL map, a correlation of fracture density index value to circulation loss values for the hydrocarbon reservoir; determining, based on the correlation, a location of a hydrocarbon well to be drilled; and controlling drilling of the hydrocarbon well at the location.

In some embodiments, the fracture lines of the 2D fracture model correspond to fracture planes of a 3D fracture model that represent natural fractures in the formation rock of the hydrocarbon reservoir. In certain embodiments, the FDI values for the cells are determined by way of a kernel density method. In some embodiments, the FDI values for the cells are determined by way of a line density method. In certain embodiments, the operations further including determining a 2D circulation loss model including circulation loss points representing locations of circulation loss events observed during drilling of wells in the hydrocarbon reservoir, where the CL values for each of the cell is determined based on a proximity of the cells to the circulation loss points. In some embodiments, determining the correlation of fracture density index to circulation losses includes fitting a line to a plot of FDI-CL value pairs for respective cells of the grid of cells representing the hydrocarbon reservoir, where the correlation is defined by the line. In certain embodiments, the operations further including generating a FDI model indicating FDI values across the area of the reservoir corresponding to the 2D grid of cells and locations of circulation loss events observed during drilling of wells in the hydrocarbon reservoir, where the location of the well to be drilled is determined based on the FDI model.

Provided in some embodiments is a hydrocarbon reservoir development system including: a hydrocarbon reservoir control system including non-transitory computer readable storage medium including program instructions stored thereon that are executable by a processor to perform the following operations for developing a hydrocarbon reservoir: determining, based on fracture data for the hydrocarbon reservoir, a 2D fracture model including fracture lines representing locations of fractures in formation rock of the hydrocarbon reservoir; determining, based on the lines of the 2D fracture model, a fracture density index (FDI) map including FDI values for cells of a 2D grid of cells representing the hydrocarbon reservoir, the determining of the FDI map including, for each cell of the grid of cells, determining a FDI value for the cell based on a proximity of the cell to the location of the fracture lines; determining a circulation loss (CL) map including circulation loss values for the cells of the 2D grid of cells representing the hydrocarbon reservoir, the determining of the circulation loss map including, for each cell of the grid of cells, determining a CL value for the cell based on a proximity of the cell to locations of circulation loss events in the hydrocarbon reservoir; determining, based on the FDI map and the CL map, a correlation of fracture density index value to circulation loss values for the hydrocarbon reservoir; determining, based on the correlation, a location of a hydrocarbon well to be drilled; and controlling a drilling system to drill the hydrocarbon well at the location.

In some embodiments, the fracture lines of the 2D fracture model correspond to fracture planes of a 3D fracture model that represent natural fractures in the formation rock of the hydrocarbon reservoir. In certain embodiments, the FDI values for the cells are determined by way of a kernel density method or a line density method. In some embodiments, the operations further including determining a 2D circulation loss model including circulation loss points representing locations of circulation loss events observed during drilling of wells in the hydrocarbon reservoir, where the CL values for each of the cell is determined based on a proximity of the cells to the circulation loss points. In certain embodiments, determining the correlation of fracture density index to circulation losses includes fitting a line to a plot of FDI-CL value pairs for respective cells of the grid of cells representing the hydrocarbon reservoir, where the correlation is defined by the line. In some embodiments, the operations further including generating a FDI model indicating FDI values across the area of the reservoir corresponding to the grid of cells and locations of circulation loss events observed during drilling of wells in the hydrocarbon reservoir, where the location of the well to be drilled is determined based on the FDI model.

BRIEF DESCRIPTION OF THE DRAWINGS

FIG. 9 is a diagram that illustrates a 2D circulation loss (CL) model in accordance with one or more embodiments.

FIG. 10 is a diagram that illustrates a 2D CL map for a full population of wells in accordance with one or more embodiments.

FIG. 11 is a diagram that illustrates well density (WD) map for a full population of wells in accordance with one or more embodiments.

FIG. 12 is a diagram that illustrates a normalized 2D CL map in accordance with one or more embodiments.

Figure 1:
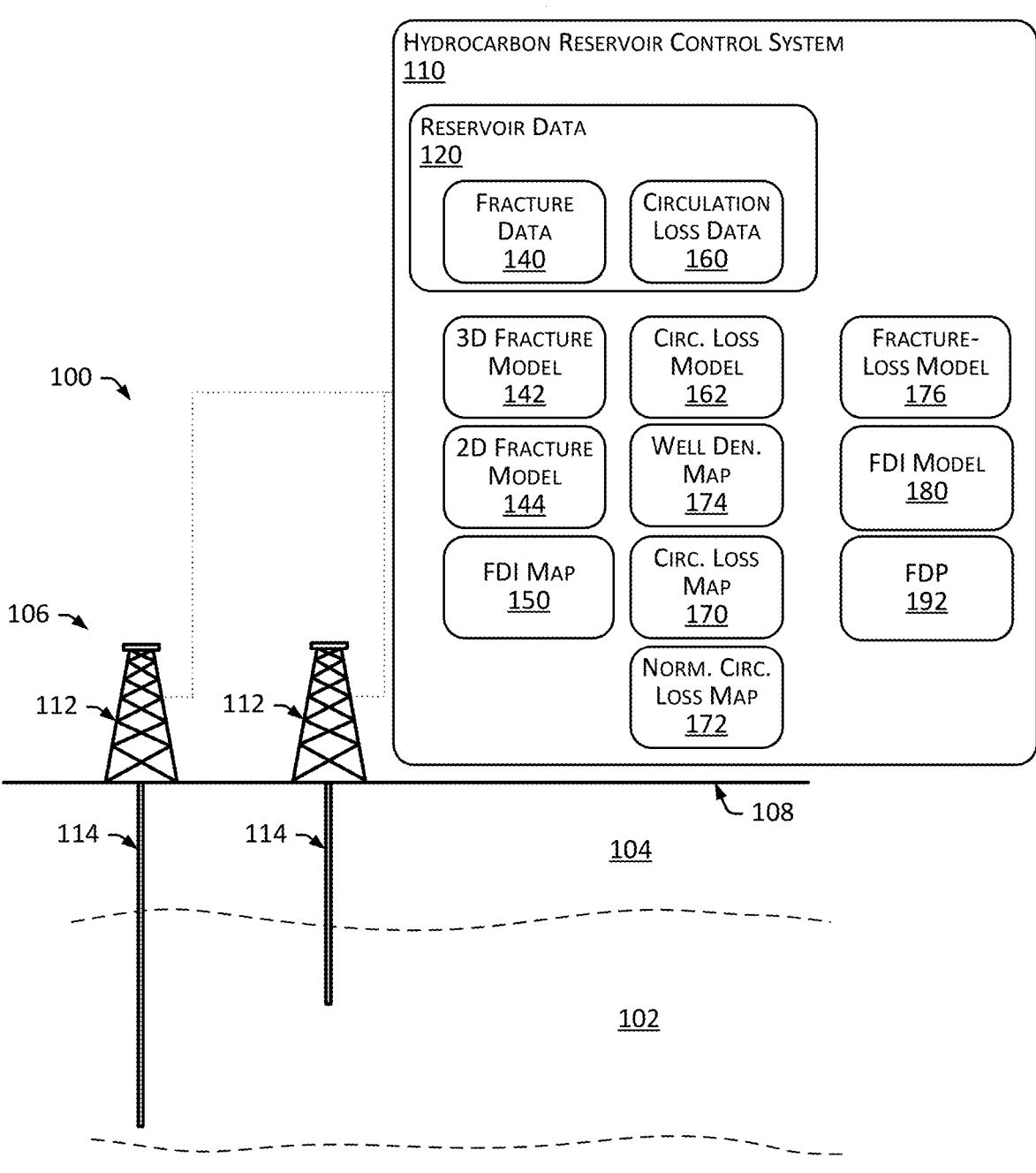
FIG. 1 is diagram that illustrates a hydrocarbon reservoir environment in accordance with one or more embodiments.

While this disclosure is susceptible to various modifications and alternative forms, specific embodiments are shown by way of example in the drawings and will be described in detail. The drawings may not be to scale. It should be understood that the drawings and the detailed descriptions are not intended to limit the disclosure to the particular form disclosed, but are intended to disclose modifications, equivalents, and alternatives falling within the spirit and scope of the present disclosure as defined by the claims.

DETAILED DESCRIPTION

Described are embodiments for predicting the location and extent of fractured zones in naturally fractured reservoirs and developing a hydrocarbon reservoir based thereon. In some embodiments, a fracture density index (FDI) model is generated that provides correlations of reservoir fracture density and associated locations of circulation losses. The FDI model may, for example, define a relationship between FDI and circulation loss values and provide a graphical representation of FDI values and locations of circulation losses across an area of a hydrocarbon reservoir. In some embodiments, an FDI model is used to determine locations for drilling wells in the reservoir. For example, a well location may be selected based on a FDI model indicating that the location has a relatively low fracture density and is located relatively long distance from circulation losses, and well may be drilled at the well location.

FIG. 1 is a diagram that illustrates a hydrocarbon reservoir environment ("reservoir environment") 100 in accordance with one or more embodiments. In the illustrated embodiment, the reservoir environment 100 includes a hydrocarbon reservoir ("reservoir") 102 located in a subsurface formation ("formation") 104, and a hydrocarbon reservoir development system 106.

The formation 104 may include a porous or fractured rock formation that resides underground, beneath the Earth's surface ("surface") 108. The reservoir 102 may include a portion of the formation 104 that contains (or that is determined to contain) a subsurface pool of hydrocarbons, such as oil and gas. The formation 104 and the reservoir 102 may each include different layers of rock having varying characteristics (e.g., varying degrees of permeability, porosity, water saturation or oil saturation). The hydrocarbon reservoir development system 106 may, for example, facilitate assessment of the reservoir and the extraction (or "production") of hydrocarbons from the reservoir 102.

In some embodiments, the hydrocarbon reservoir development system 106 includes a hydrocarbon reservoir control system ("control system") 110 and one or more wells 112. In some embodiments, the control system 110 includes a computer system that is the same as or similar to that of computer system 1500 described with regard to at least FIG. 15. Each of the wells 112 may include a wellbore 114 that extends from the surface 108 into a target zone of the formation 104, such as the reservoir 102. The wellbore 114 may be created, for example, by a drill bit of a well drilling system (e.g., controlled by the control system 110) boring along a path (or "trajectory") extending from a location on the surface 108, through rock of the formation 104 and the reservoir 102.

In some embodiments, the control system 110 performs operations for fracture density index (FDI) modeling and development of the reservoir 102. For example, the control system 110 may provide for monitoring reservoir operations (e.g., including well drilling operations, seismic surveying operations or well logging operations), determining associated reservoir data 120 (e.g., including observed drilling circulation losses and 3D discrete fracture data), and generating corresponding correlations and models (e.g., including mappings or correlations of fracture density and circulation losses in the reservoir 102) for use in developing the reservoir 102 (e.g., for use in selecting locations for drilling wells into the reservoir 102).

In some embodiments, the control system 110 is operable to perform some or all of the following operations for generating a FDI model 180 based on fracture and circulation loss data, and employing the FDI model 180 in development of the reservoir 102: (1) determining, based on fracture data 140 for the reservoir, a three-dimensional (3D) fracture model 142 including planes (e.g., extending vertically, in the z-axis) representing natural fractures within formation rock of the hydrocarbon reservoir 102 (e.g., using geomechanics-based techniques, such as those described in U.S. Pat. No. 10,607,043, which is hereby incorporated by reference); (2) determining a two-dimensional (2D) fracture model 144 having lines (e.g., extending horizontally, in the x-y plane) corresponding to the planes of the 3D fracture model 142; (3) determining a FDI map 150 based on the 2D fracture lines, including FDI values for a 2D set of cells (or "grid of cells") representing an area of the reservoir 102 (e.g., determined using a kernel or line density technique for line features that assigns values to cells based on their proximity to the fracture lines); (4) determining, based on circulation loss data 160 for the reservoir 102, a circulation loss (CL) model 162 including points (e.g., x-y coordinates) corresponding to locations of observed drilling mud circulation losses of wells 114 drilled into the reservoir 102; (5) determining, based on the points of the CL model 162, a "normalized" CL map 172 including normalized circulation loss (CL) density values for the 2D set of cells representing the area of the reservoir (e.g., determined using a kernel density technique for point features that assigns values to cells based on their proximity to the points of the CL model 162); (6) generating, based on respective sets of the FDI values and CL density values for the respective cells of the 2D set of cells, a correlation of the FDI and CL values of the cells (e.g., a linear relationship based on a fitting of a line to a scatter plot of the FDI-CL values pairs for the 2D set of cells); and (7) generating a FDI model 180 that presents (e.g., graphically) the FDI map 150 and the CL locations integrated with one another, and the correlation of the cell FDI and CL values. As described, the FDI model 180 may be employed as a basis to generate an FDP 192 that specifies reservoir development parameters, such as locations, trajectories or operational parameters for hydrocarbon wells in the reservoir. An operator may locate, drill or operate wells in accordance with the parameters of the FDP 192. For example, a well operator may select a well location based on the FDI model 180 indicating that the location has a relatively low fracture density (e.g., below a FDI value threshold) and is located relatively long distance from circulation losses (e.g., more than a threshold distance from the location of an observed circulation loss event), generate an FDP 192 that specifying the selected well location, and control drilling of a well at the well location based on the FDP 192.

Figure 2:
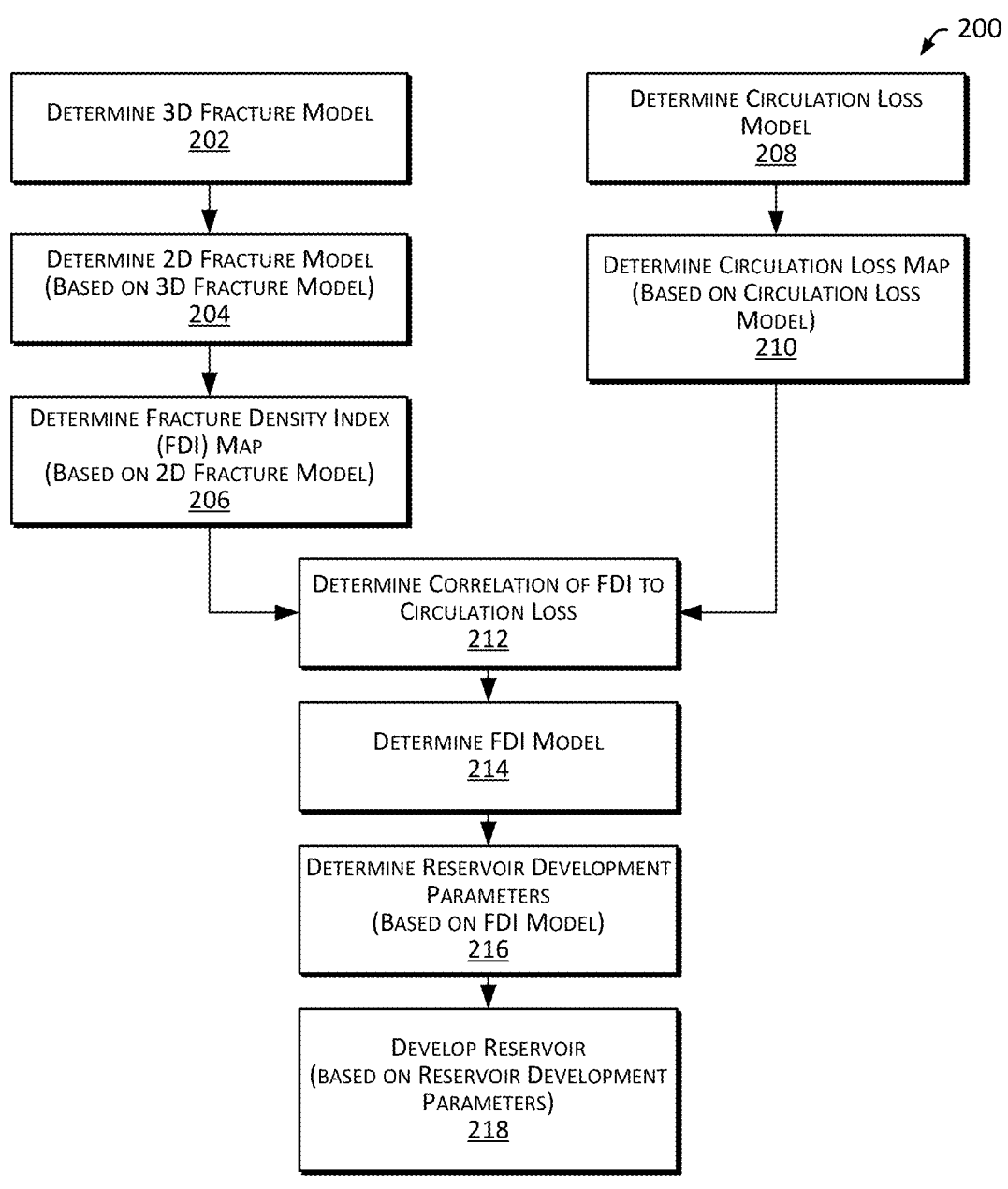
FIG. 2 is a flowchart that illustrates a method of hydrocarbon reservoir development in accordance with one or more embodiments.

FIG. 2 is a flowchart that illustrates a method 200 of hydrocarbon reservoir modeling and development in accordance with one or more embodiments. Some or all of the procedural elements of method 200 may, for example, be performed by the control system 110 (or another reservoir operator).

Figure 3:
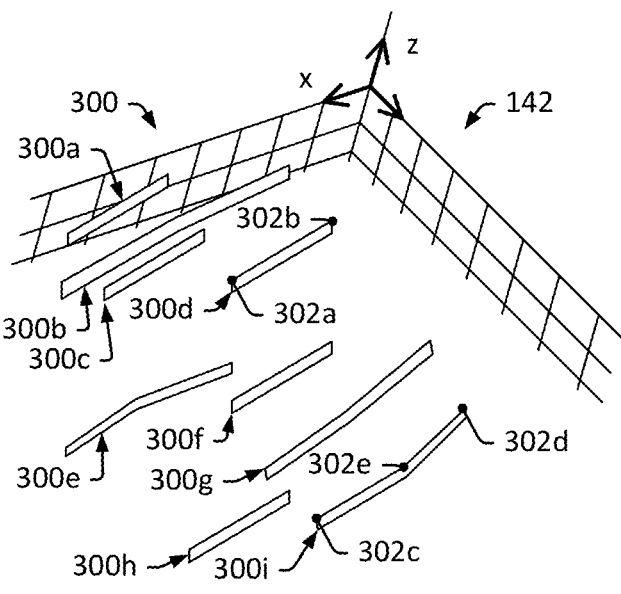
FIG. 3 is a diagram that illustrates a three-dimensional (3D) fracture model in accordance with one or more embodiments.

In some embodiments, method 200 includes determining a 3D fracture model (block 202). This may include determining a 3D fracture modeling of a reservoir that includes 3D planes (e.g., in the x-y-z space) representing the location of fractures (e.g., natural fractures) present within a reservoir. For example, this may include the control system 110 (or another reservoir operator), determining, based on fracture data 140 for the reservoir 102, a 3D fracture model 142 of the reservoir 102 that includes 3D planes (e.g., in the x-y-z space) representing the location of fractures (e.g., natural fractures) present within the reservoir 102. The fracture data 140 may include, for example, seismic data obtained by way of seismic surveying operations of the reservoir 102, well log data obtained by way of well logging operations conducted in wells 112 in the reservoir 102, rock properties obtained by way of core samples extracted from wells 112 in the reservoir 102, or the like. In some embodiments, the 3D fracture model 142 is determined using a geomechanics and natural fracture prediction (NFP) technique, such as that described in U.S. Pat. No. 10,607,043 by Carmargo et al., titled "Subsurface Reservoir Model with 3D Natural Fractures Prediction" and issued Mar. 31, 2020, which is hereby incorporated by reference. FIG. 3 is a diagram that illustrates an example 3D fracture model 142 in accordance with one or more embodiments. In the illustrated embodiment, the 3D fracture model 142 includes nine planar objects 300 (e.g., planes 300a-300i) representing nine respective fracture planes in three dimensions. Each of the planes 300a-300i generally extend horizontally in the x-direction and vertically in the z-direction. Each of the planes 300a-300i may, for example, correspond to a location of a 3D critical discrete fracture plane whose location and extent is determined using a geomechanics and natural fracture prediction (NFP) technique, such as that described in U.S. Pat. No. 10,607,043.

Figure 4:
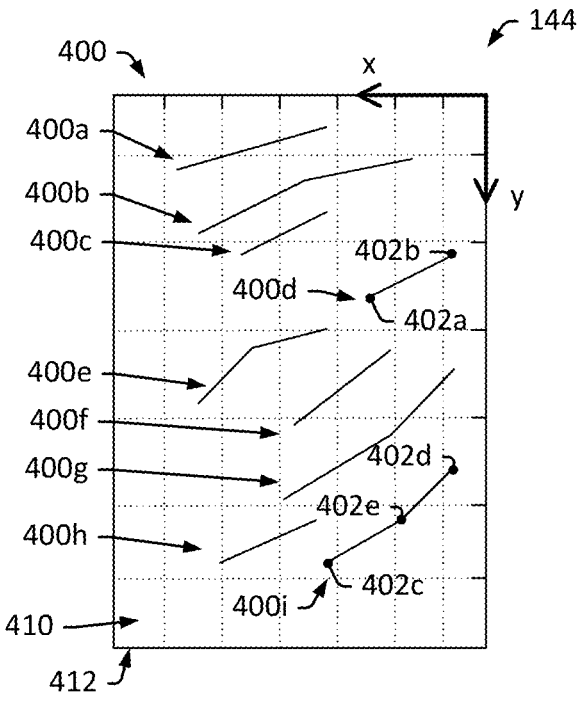
FIG. 4 is a diagram that illustrates a two-dimensional (2D) fracture model in accordance with one or more embodiments.

In some embodiments, method 200 includes determining a 2D fracture model (block 204). This may include determining a 2D fracture modeling of the reservoir that includes 2D lines (e.g., in the x-y plane) representing the location of fractures (e.g., natural fractures) present within a reservoir. For example, this may include the control system 110 (or another reservoir operator), determining, based on the 3D planes (e.g., in the x-y-z space) 300 of the 3D fracture model 142 representing the location of fractures (e.g., natural fractures) present within the reservoir 102, a 2D fracture model 144 of the reservoir 102 that includes 2D lines (e.g., in the x-y plane) corresponding to the 3D planes 300 and representing the location of the fractures (e.g., the natural fractures) present within the reservoir 102. In some embodiments, the 2D lines are defined by endpoints (or vertices) of respective 3D planes. For example, a 2D line corresponding to a 3D plane 300 may be defined by the x and y coordinates of the endpoints of the top or bottom edge of the 3D plane. FIG. 4 is a diagram that illustrates an example 2D fracture model 144 (e.g., generated from the 3D fracture model 142 of FIG. 3) in accordance with one or more embodiments. In the illustrated embodiment, the 2D fracture model 144 includes nine linear objects 300 (e.g., lines 400a-400i) corresponding to respective ones of the planar objects 300 (e.g., planes 300a-300i) of the 3D fracture model 142 of FIG. 3 and representing the nine respective fracture planes in two dimensions (e.g., in the x-y plane). As illustrated, each of the lines 400a-400i are contained in the x-y plane and generally extend horizontally in the x-direction. In the illustrated embodiment, the endpoints (and vertices) of the lines 300 correspond to the x and y coordinates of the endpoints of the top edge of the corresponding 3D plane 300. For example, with regard to line 400d and plane 300d, points 402a and 402b correspond to respective endpoints 302a and 302b of the top edge of the plane 300d. As a further example, with regard to line 400i and plane 300i (which is itself formed of two planes that abut one another to form the plane 300i), points 402c, 402d and 400e correspond to respective endpoints 302c and 302d and the vertex 302e of the top edge of the plane 300i. Accordingly, each of the lines 400a-400i may correspond to respective ones of the planes 300a-300i and the associated location of a 3D critical discrete fracture plane in the reservoir 102.

In some embodiments, method 200 includes determining a fracture density index (FDI) map (block 206). This may include determining a FDI map that includes a 2D grid of cells (or "grid cells") (e.g., in the x-y plane) representing an area of a reservoir, with each of the cells being associated with a FDI value that is indicative of the proximity of the cell to one or more fractures of a discrete fracture network of the reservoir. For example, this may include the control system 110 (or another reservoir operator), determining a FDI map 150 that includes, for each of the cells in a 2D grid of cells representing an area of the reservoir 102 (e.g., a grid of cells extending in the x-y plane and representing the surface 108 above reservoir 102), a FDI value that is indicative of the proximity of the cell to one or more fracture planes in the reservoir 102. Referencing, the 2D fracture model 144 of FIG. 4, determining a FDI map 150 may include, for each cell 410 of a grid of cells 412 representing an area of the reservoir 102, a FDI value that is indicative of the proximity of the cell 410 to the lines 400a-400i (which correspond to the location of a 3D critical discrete fracture plane in the reservoir 102).

In some embodiments, the FDI map 150 is illustrated by a 2D "heat map" of the area of the reservoir represented by the grid of cells, having color variations corresponding to the FDI values. For example, the FDI map 150 may be displayed as a heat map having relatively darker colors in locations corresponding to cells having relatively high FDI values and having relatively lighter colors in locations corresponding to cells having relatively low FDI values. In such a FDI map 150 darker colors may represent areas more likely to be at or near a natural fracture in the reservoir 102 and lighter colors may represent areas less likely to be at or near a natural fracture in the reservoir 102.

Figure 5:
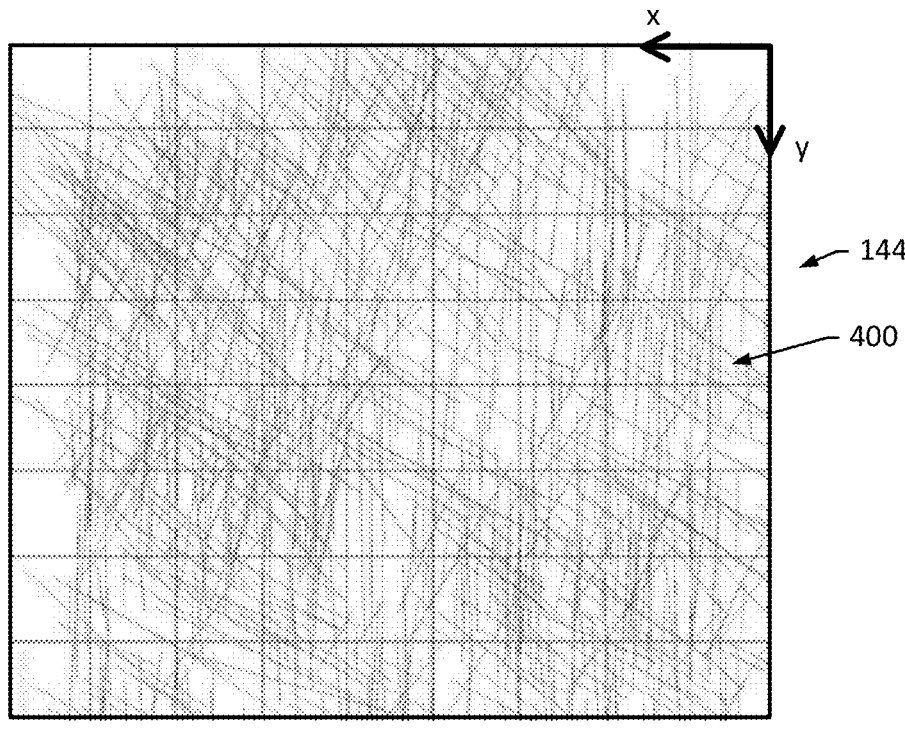
FIG. 5 is a diagram that illustrates a 2D fracture model in accordance with one or more embodiments.
Figure 6:
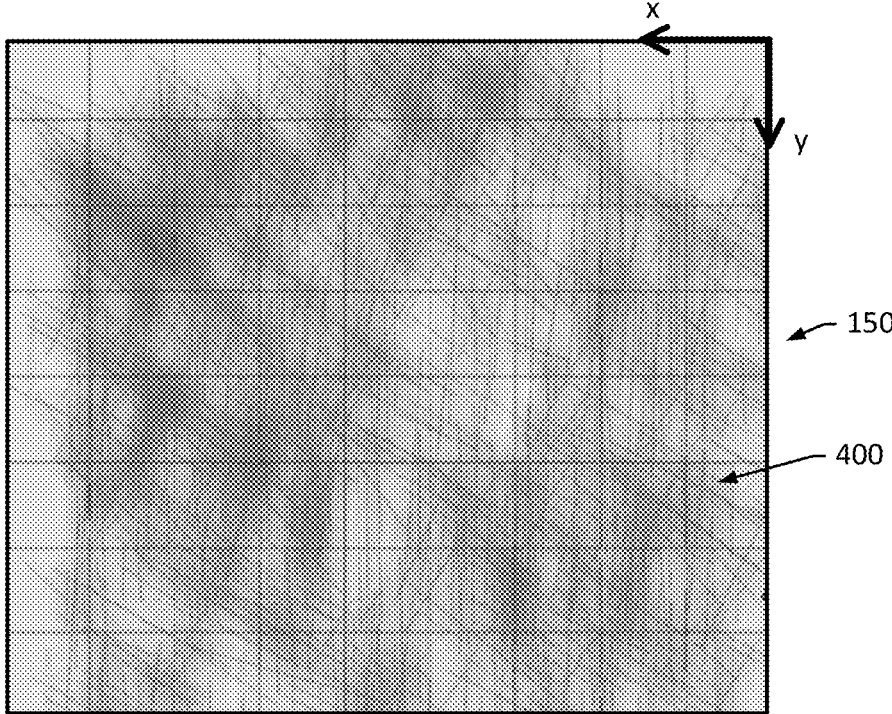
FIG. 6 is a diagram that illustrates a fracture density index (FDI) map in accordance with one or more embodiments.

FIG. 5 is a diagram that illustrates a 2D fracture model 144 in accordance with one or more embodiments. In the illustrated embodiment, the 2D fracture model 144 includes a number of individual 2D lines 400 (in the x-y plane) and representing fracture planes in a reservoir. FIG. 6 is a diagram that illustrates a FDI map 150 corresponding to the 2D fracture model 144 of FIG. 5 in accordance with one or more embodiments. In the illustrated embodiment, the FDI map 150 includes a heat map having relatively darker colors in locations corresponding to cells having relatively high FDI values and having relatively lighter colors in locations corresponding to cells having relatively low FDI values. For example, the FDI map 150 has relatively dark colors in locations of cells relatively close in proximity to one or more of the lines 400 and has relatively light color in locations of cells relatively far from a line 400.

In some embodiments, the FDI values for the cells of a FDI map are determined based on proximity of the respective cells to a line representing a natural fracture. For example, a cell located relatively close to a line may have a relatively high FDI value (e.g., FDI=1.0), whereas a cell located relatively far from a line may have a relatively low FDI value (e.g., FDI=0.0). In some instances, the FDI value is based on an aggregation of proximity of a cell to different lines such that a cell located relatively close to multiple lines may have a relatively high FDI value (e.g., based on a sum of a first FDI value attributable to proximity of the cell to a first line and a second FDI value attributable to proximity of the cell to a second line).

Figures 7, 8:
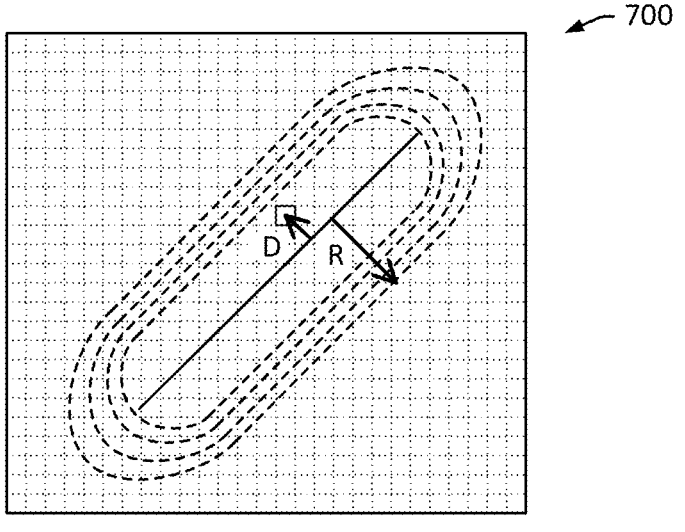
FIG. 7 is a diagram that illustrates aspects of a kernel density method for line features in accordance with one or more embodiments.
FIG. 8 is a diagram that illustrates aspect of a line density technique for line features in accordance with one or more embodiments.

In some embodiments, FDI values correspond to an effective spatial density distribution of a fracture network. This may provide for relatively high FDI values for cells having centers near a line and relatively low FDI values for cells having centers far from a line. In some embodiments, FDI values are determined using a kernel density method (for line features). This can include calculating a magnitude-per-unit area from line features to using a kernel function to fit a smoothly tapered surface to each line. Using the kernel density method, the FDI value is maximum (e.g., FDI=1.0) at the line and diminishes with increased distance from the line, to a minimal value (e.g., FDI=0) at a specified search radius (R) (e.g., R=100 meters (m)). FIG. 7 is a diagram 700 that graphically illustrates a kernel density method for line features in accordance with one or more embodiments. In the illustrated embodiment, a search radius (R) is defined, and the FDI value attributable to the line 400 diminishes with distance from the line (as illustrated by the concentric rings). Accordingly, the FDI value for the cells 410 in a grid of cells 412 surrounding the line 400 may decrease with an increase in distance (D) between the line 400 and the cell center. For example, where a search radius (R) of 100 m is specified, a cell having a center located on a line 400 may have a FDI value of 1, a cell having a center located 50 m from the line 400 may have a FDI value of 0.5, and a cell having a center located 100 m or greater from the line 400 may have a FDI value of 0.0. In such an embodiment, the FDI value for a cell may be a sum of FDI values attributable to one or more lines representing a natural fracture. Continuing with the above example of a 100 m search radius, where the center of a cell is located 50 m from a first line 400 and 101 m from a second line, the cell may have a FDI value of 0.5 based on a sum of the FDI value of 0.5 attributable to the first line and the FDI value of 0.0 attributable to the second line. Where the center of a cell is located 0 m from a first line 400 and 50 m from a second line, the cell may have a FDI value of 1.5 based on a sum of the FDI value of 1.0 attributable to the first line and the FDI value of 0.5 attributable to the second line. In some embodiments, the FDI values can be determined in accordance with a kernel density method by employing a density computation tool of Geographic Information System (GIS) software, such as the "kernel density" (for line features) tool of ArcGIS Pro software provided by Esri having headquarters in Redlands California, USA.

In some embodiments, FDI values are determined using a line density method. This can include calculating a FDI for a cell based on the length of portions of one or more lines falling within a radius (or "neighborhood") of the center of the cell. FIG. 8 is a diagram 800 that illustrates a line density method in accordance with one or more embodiments. In the illustrated embodiment, a "neighborhood" is defined by a radius (R) from the center of a cell 410, and the FDI value for the cell 410 is determined based on the lengths of the portions of the lines 400 falling within the neighborhood (e.g., lengths $L_1$ and $L_2$). For example, the FDI value for the cell 410 in the illustrated embodiment may be determined as follows:

$$FDI = \frac{(L_1 * V_1) + (L_2 * V_2)}{\pi R^2} \tag{1}$$

where FDI is the FDI value for the cell, $L_1$ and $L_2$ are the respective lengths of the portions of the two lines 400 within the neighborhood defined by the radius R, $V_1$ and $V_2$ are population field values for the corresponding lines/lengths. The population field values can be selected for lines/fractures to weight the lines/fractures. For example, $V_1$ can be assigned a relatively high value and $V_2$ can be assigned a relatively low value to weight the "first" line (and its length, $L_1$) more heavily than the "second" line (and its length, $L_2$). Thus, for example, a population field value (V) can be set to 1 for all lines if no relative weighting is desired. Although two lines are discussed for the purpose of explanation, any number of lines/lengths may be accounted for in a similar manner. In some embodiments, the FDI values can be determined in accordance with a line density method by employing a density computation tool of Geographic Information System (GIS) software, such as the "line density" tool of ArcGIS Pro software provided by Esri having headquarters in Redlands California, USA.

In some embodiments, method 200 includes determining a circulation loss model (block 208). This may include determining a 2D modeling of points of observed circulation losses for wells drilled in a reservoir. For example, this may include the control system 110 (or another reservoir operator), determining, based on circulation loss data 160 for the reservoir 102, a circulation loss model 142 of the reservoir 102 that includes a 2D mapping of locations of circulation losses observed during drilling of wells into the reservoir 102. The circulation loss data 160 may include, for each instance of circulation loss observed at a well in the reservoir, a location (x and y coordinate) of the well, and the circulation loss model 142 may include a 2D mapping of points corresponding to the locations of circulation losses observed during drilling of wells into the reservoir 102. The 2D mapping of points of circulation losses may be, for example, across the same area of the reservoir 102 represented by the 2D grid of cells (e.g., in the x-y plane) of the FDI map 150. FIG. 9 is a diagram that illustrates a circulation loss (CL) model 162 in accordance with one or more embodiments. In the illustrated embodiment, the CL model 162 includes a 2D mapping of points of circulation losses 900 (represented by dots) corresponding to the locations of circulation losses observed during drilling of wells into the reservoir 102, across the same area of the reservoir 102 represented by the 2D grid of cells (e.g., in the x-y plane) of FDI map 150 of FIG. 6.

In some embodiments, method 200 includes determining a circulation loss (CL) map (block 210). This may include determining a CL map that includes a 2D grid of cells (e.g., in the x-y plane) representing an area of a reservoir, with each of the cells being associated with a CL density value that is indicative of the proximity of the cell to one or more of the circulation loss events in the area reservoir. For example, this may include the control system 110 (or another reservoir operator), determining a CL map 170 that includes, for each of the cells in a 2D grid of cells representing the area of the reservoir 102 (e.g., a grid of cells extending in the x-y plane and representing the surface 108 above reservoir 102), a CL value that is indicative of the proximity of the cell to one or more points/locations of circulation loss events in the reservoir 102. Referencing, the CL model 162 of FIG. 9, determining a CL map 150 may include, for each cell of a grid of cells, determining a CL value that is indicative of the proximity of the cell to the points of circulation losses 900 in the reservoir 102.

In some embodiments, the CL map 170 is illustrated by a 2D "heat map" of the area of the reservoir represented by the grid cells, having color variations corresponding to the CL value. For example, the CL map 170 may be displayed as a heat map having relatively darker colors in locations corresponding to cells having relatively high CL values and having relatively lighter colors in locations corresponding to cells having relatively low CL values. In such a CL map 170 darker colors may represent areas more likely to be at or near a circulation loss event in the reservoir 102 and lighter colors may represent areas less likely to be at or near a circulation loss event in the reservoir 102. FIG. 10 is a diagram that illustrates a CL map 170 corresponding to the CL map 150 of FIG. 9, in accordance with one or more embodiments. In the illustrated embodiment, the CL map 170 includes a heat map having relatively darker colors in locations corresponding to cells having relatively high CL values and having relatively lighter colors in locations corresponding to cells having relatively low CL values. For example, the CL map 170 has relatively dark colors in locations of cells relatively close in proximity to one or more of the points 900 and has relatively light color in locations of cells relatively far from the points 900.

In some embodiments, the CL values for the cells of a CL map are determined based on proximity of a cell to a point representing a circulation loss event. For example, a cell located relatively close to a point/location of a circulation loss event may have a relatively high CL value (e.g., CL=1.0), whereas a cell located relatively far from a point/location of a circulation loss event may have a relatively low CL value (e.g., CL=0.0). In some instances, the CL value of a cell is based on an aggregation of proximity to different points/locations such that a cell located relatively close to multiple points/locations may have a relatively high CL value (e.g., based on a sum of a first CL value attributable to proximity of the cell to a first point/location of a circulation loss event and a second CL value attributable to proximity of the cell to a second point/location of a circulation loss event).

In some embodiments, CL values are determined using a kernel density method (for point features). This can include calculating a magnitude-per-unit area from point features to using a kernel function to fit a smoothly tapered surface to each point. Using the kernel density method, the CL value is maximum (e.g., CL=1.0) at the point and diminishes with increased distance from the point, to a minimal value (e.g., CL=0) at a specified search radius (R) (e.g., R=100 meters (m)). Accordingly, the CL value for the cells in a grid of cells surrounding a point of a circulation loss event may decrease with an increase in distance (D) between the point and the cell center. For example, where a search radius (R) of 100 m is specified, a cell having a center located at a first point of a circulation loss event may have a CL value of 1, a cell having a center located 50 m from the point may have a CL value of 0.5, and a cell having a center located 100 m or greater from the point may have a CL value of 0.0. In such an embodiment, the CL value for a cell may be a sum of CL values attributable to one or more points of circulation loss events. Continuing with the above example of a 100 m search radius, where the center of a cell is located 50 m from a first point and 101 m from a second point, the cell may have a CL value of 0.5 based on a sum of the CL value of 0.5 attributable to the first point and the CL value of 0.0 attributable to the second point. Where the center of a cell is located 0 m from a first point and 50 m from a second point, the cell may have a CL value of 1.5 based on a sum of the CL value of 1.0 attributable to the first point and the CL value of 0.5 attributable to the second point. In some embodiments, the CL values can be determined in accordance with a kernel density method by employing a density computation tool of Geographic Information System (GIS) software, such as the "kernel density" (for point features) tool of ArcGIS Pro software provided by Esri having headquarters in Redlands California, USA.

In some embodiments, the CL map 170 is normalized with respect to the entire population of wells in the area represented by the CL map 170 to generate a "normalized" CL map 172. This may include, dividing the CL map 170 by a well density (WD) mapping of the entire population of wells in the area represented by the CL map 170 (not just the wells having observed circulation losses), to generate a "normalized" CL map 172. For example, an "initial" CL map 170 (e.g., the CL map 170 of FIG. 10) may be generated based on the locations of wells having observed circulation losses in the area represented by the CL map 170, as described above, and a well density (WD) map 174 may be generated based on the locations of the entire population of wells in the area represented by the CL map 170. The "initial" CL map 170 may be divided by the well density map 174 to generate a "normalized" CL map 172 for the area. In such an embodiment, the "normalized" version of the CL map 172, can be used in subsequent processing and reservoir assessment. Each of the CL map 170 and the WD map 174 may have a corresponding 2D grid of cells, with each cell of the CL map 170 being associated with a CL value determined for the cell, and with each cell of the WD map 174 being associated with a WD value determined for the cell. Dividing of the CL map 170 by the WD map 174 to generate a normalized CL map 172 for the area may include, for each of corresponding pair of cell locations in the CL map 170 and the WD map 174, dividing the CL value determined for the cell/location of the CL map 170 by the WD value determined for the cell/location of the WD map 174, to generate a "normalized" CL value for the cell/ location, where the normalized CL map 172 includes a grid of cells for the area, with each cell being associated with the normalized CL value determined for the respective cell/ location.

In some embodiments, generation of a well density mapping includes determining a well density (WD) model based on locations of wells in the population, in a manner similar to that for determining a CL model and map. This may include determining a 2D modeling of points of wells drilled in a reservoir. For example, this may include the control system 110 (or another reservoir operator), determining, based on well location data, a WD model of the reservoir 102 that includes a 2D mapping of points corresponding to the locations of wells in the area of the reservoir 102 represented by the CL map 170. The well location data may include, for each well in the reservoir, a location (x and y coordinate) of the well, and the WD model may include a 2D mapping of points corresponding to the locations of wells in the area of the reservoir 102 represented by the CL map 170. The 2D mapping of the WD model may, for example, be across the same area of the reservoir 102 represented by the 2D grid of cells (e.g., in the x-y plane) of FDI map 150 and the CL map 170. The WD model may look similar to CL model of FIG. 9, with points (represented as dots) corresponding to the locations of wells as opposed to locations of circulation losses.

In some embodiments, generation of a WD map includes determining a WD map based on the WD model. This may include determining a WD map that includes a 2D grid of cells (e.g., in the x-y plane) representing an area of a reservoir, with each of the cells being associated with a well density value that is indicative of the proximity of the cell to the locations of one or more wells in the area of the reservoir. For example, this may include the control system 110 (or another reservoir operator), determining a WD map 174 that includes, for each of the cells in a 2D grid of cells representing the area of the reservoir 102 (e.g., a grid of cells extending in the x-y plane and representing the surface 108 above reservoir 102), a WD value that is indicative of the proximity of the cell to one or more points corresponding to the locations of wells in the area of the reservoir 102 represented by the CL map 170.

In some embodiments, the WD map 174 can be is illustrated by a 2D "heat map" of the area of the reservoir represented by the grid of cells, having color variations corresponding to the WD values. For example, the WD map 172 may be displayed as a heat map having relatively darker colors in locations corresponding to cells having relatively high WD values and having relatively lighter colors in locations corresponding to cells having relatively low WD values. In such a WD map 174 darker colors may represent areas at or near one or more well drilled in the reservoir 102 and lighter colors may represent areas farther from wells drilled in the reservoir 102. FIG. 11 is a diagram that illustrates a WD map 174 in accordance with one or more embodiments. In the illustrated embodiment, the WD map 174 includes a heat map having relatively darker colors in locations of cells having relatively high WD values and having relatively lighter colors in locations of cells having relatively low WD values. For example, the WD map 174 has relatively dark colors in locations corresponding to cells relatively close in proximity to one or more of the points 1100 corresponding to locations of wells drilled in the reservoir 102 and has relatively light color in locations corresponding to cells relatively far from the points 1100 corresponding to locations of wells drilled in the reservoir 102.

In some embodiments, the WD values for the cells of a WD map are determined based on proximity of a cell to one or more points representing the location of a well. For example, a cell located relatively close to a point corresponding to the location of a well drilled into the reservoir 102 may have a relatively high WD value (e.g., WD=1.0), whereas a cell located relatively far from a point corresponding to the location of a well drilled into the reservoir 102 may have a relatively low WD value (e.g., WD=0.0). In some instances, the WD value of a cell is based on an aggregation of proximity to different points such that a cell located relatively close to multiple points may have a relatively high WD value (e.g., based on a sum of a first WD value attributable to proximity of the cell to a first point corresponding to the location of a well drilled and a second WD value attributable to proximity of the cell to a second point corresponding to the location of a well drilled). In some embodiments, WD values are determined using a kernel density method (for point features), in a manner similar to that described above with regard to determination of CL values. FIG. 12 is a diagram that illustrates an example "normalized" CL map 172 for a population of wells where LC events have been observed in accordance with one or more embodiments. The illustrated "normalized" CL map 172 may, for example, be generated by dividing the CL map 170 of FIG. 10 by the WD map 174 of FIG. 11.

Figure 13:
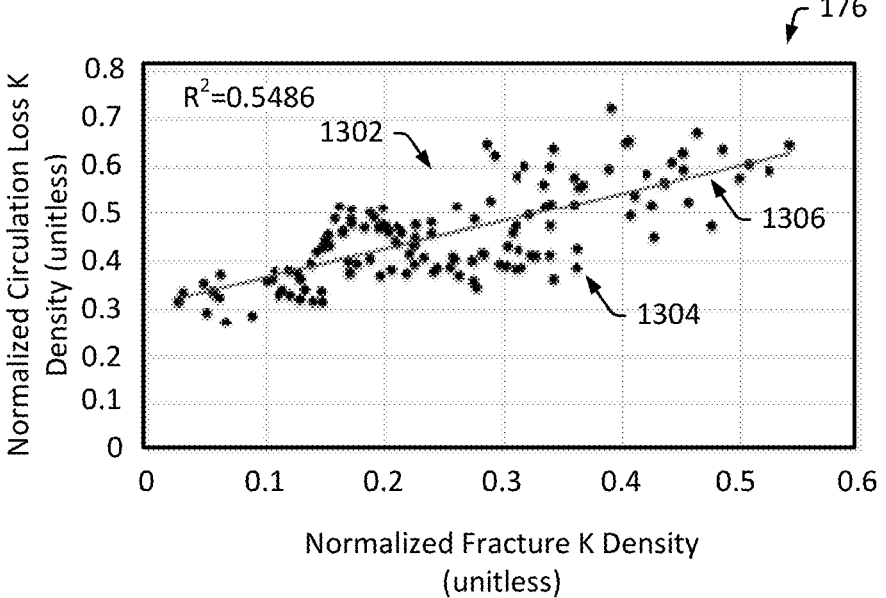
FIG. 13 is a diagram that illustrates a fracture-loss model in accordance with one or more embodiments.

In some embodiments, method 200 includes determining a correlation of FDI to circulation loss (block 212). This may include determining, based on respective sets of the fracture density values and circulation loss density values for cells of a 2D grid of cells representing an area of the reservoir, a correlation of the FDI values and CL values of the cells. For example, this may include the control system 110 (or another reservoir operator), determining a fracture-loss model 180 that includes a scatter plot of the fracture density values of the FDI map 150 and CL density values of the normalized CL map 172, and a line fit to the scatter plot that represents the correlation of CL values to FDI values. FIG. 13 is a diagram that illustrates an example fracture-loss model 180 in accordance with one or more embodiments. In the illustrated embodiment, the fracture-loss model 180 includes a plot 1302 of points 1304 corresponding to pairs of CL values and FDI values for corresponding cells of a FDI map 170 (e.g., the FDI map 170 of FIG. 10) and a CL map 172 (e.g., the CL map 172 of FIG. 12), and a linear best-fit line 1306 for the set of points 1304. Each point 1304 may represent a normalized FDI value for a given cell of the FDI map 170 corresponding to a location within the area of the reservoir 102 and a CL value for a cell of the CL map 172 corresponding to the location.

Figure 14:
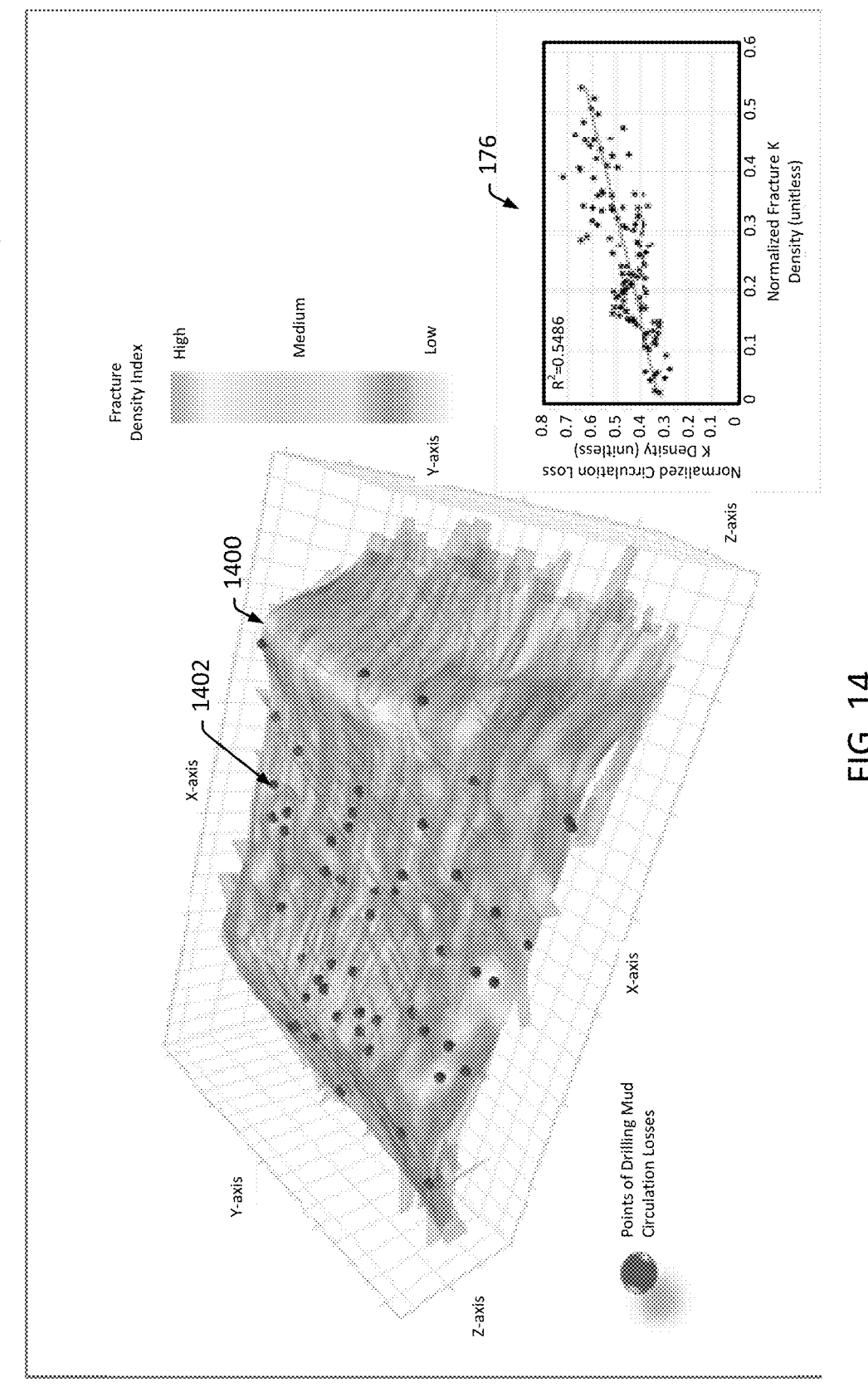
FIG. 14 is a diagram that illustrates an example FDI model in accordance with one or more embodiments.

In some embodiments, method 200 includes determining a FDI model (block 214). This may include determining, a FDI model that provides a mapping of FDI values and CL locations to enable a determination of areas with relatively high/low FDI and circulation loss locations. For example, this may include the control system 110 (or another reservoir operator), generating a FDI model 180 that includes mappings of the FDI values and locations of CL events overlaid onto one another such that areas of relatively high/low FDI and circulation loss values can be readily identified. In some embodiments, the FDI model 180 includes a representation of a determined correlation of the FDI and circulation loss values. FIG. 14 is a diagram that illustrates an example FDI model 180 in accordance with one or more embodiments. In the illustrated embodiment, the FDI model 180 includes a 3D surface 1400 corresponding to a FDI map 170 for an area of a reservoir, CL points 1402 located on the surface 1400 corresponding to locations of CL events in the area of the reservoir, and a representation of a fracture-loss model 176. The FDI model 180 may enable assessment the fracture and circulation loss characteristics of the reservoir, which can, in turn, be employed as a basis for selecting the location of one or more wells to be drilled into the reservoir.

In some embodiments, method 200 includes determining reservoir development parameters (block 216). This may include selecting a location for drilling of a well into a reservoir based on a FDI model for the reservoir. For example, this may include the control system 110 (or another reservoir operator), determining, based on the FDI model 180, one or more locations associated with a relatively low FDI value or without circulation loss (e.g., a location corresponding to a cell/location of an FDI map 170 having a FDI value below a FDI threshold or being at least a threshold distance away from a point/location of circulation loss), and selecting, from the one or more locations, a location for a well to be drilled into the reservoir 102. In some embodiments, well location, trajectory or operational parameters may be determined based on the FDI model 180. In some embodiments, determining reservoir development parameters includes the control system 110 (or another reservoir operator) generating a field development plan (FDP) 192 that specifies locations, trajectories or operational parameters for one or more hydrocarbon wells in the reservoir 102.

In some embodiments, method 200 includes developing a reservoir based on reservoir development parameters (block 218). This may include developing a reservoir based on reservoir development parameters determined based on a FDI model. For example, this may include the control system 110 (or another reservoir operator) controlling drilling or operation of a well 112 in the reservoir 102 in accordance with a FDP 192 specifying a location, trajectory or operational parameters for the well 112. For example, the control system 110 (or another reservoir operator) may control a drilling system of the hydrocarbon reservoir development system 106 to drill a well at a surface location selected based on the FDI model 180 and specified by the FDP 192.

Figure 15:
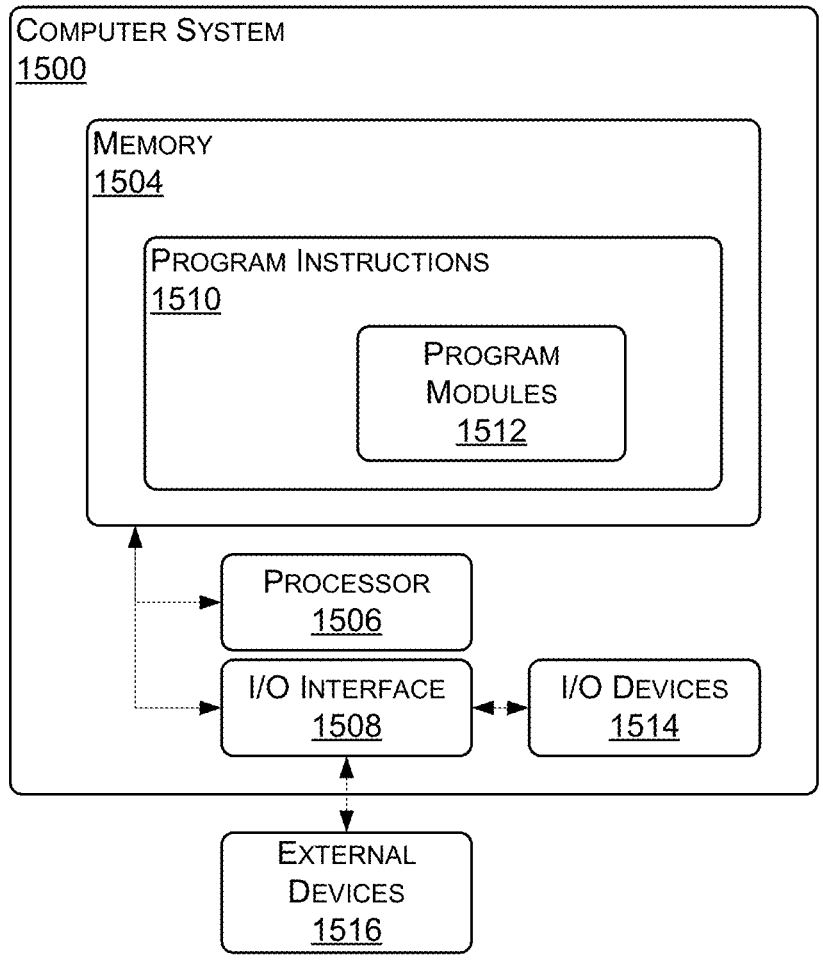
FIG. 15 is a diagram that illustrates an example computer system in accordance with one or more embodiments.

FIG. 15 is a diagram that illustrates an example computer system (or "system") 1500 in accordance with one or more embodiments. The system 1500 may include a memory 1504, a processor 1506 and an input/output (I/O) interface 1508. The memory 1504 may include non-volatile memory (e.g., flash memory, read-only memory (ROM), programmable read-only memory (PROM), erasable programmable read-only memory (EPROM), electrically erasable programmable read-only memory (EEPROM)), volatile memory (e.g., random access memory (RAM), static random access memory (SRAM), synchronous dynamic RAM (SDRAM)), or bulk storage memory (e.g., CD-ROM or DVD-ROM, hard drives). The memory 1504 may include a non-transitory computer-readable storage medium having program instructions 1510 stored on the medium. The program instructions 1510 may include program modules 1512 that are executable by a computer processor (e.g., the processor 1506) to cause the functional operations described, such as those described with regard to the control system 110 or the method 200.

The processor 1506 may be any suitable processor capable of executing program instructions. The processor 1506 may include one or more processors that carry out program instructions (e.g., the program instructions of the program modules 1512) to perform the arithmetical, logical, or input/output operations described. The processor 1506 may include multiple processors that can be grouped into one or more processing cores that each include a group of one or more processors that are used for executing the processing described here, such as the independent parallel processing of partitions (or "sectors") by different processing cores to generate a simulation of a reservoir. The I/O interface 1508 may provide an interface for communication with one or more I/O devices 1514, such as a joystick, a computer mouse, a keyboard, or a display screen (e.g., an electronic display for displaying a graphical user interface (GUI)). The I/O devices 1514 may include one or more of the user input devices. The I/O devices 1514 may be connected to the I/O interface 1508 by way of a wired connection (e.g., an Industrial Ethernet connection) or a wireless connection (e.g., a Wi-Fi connection). The I/O interface 1508 may provide an interface for communication with one or more external devices 1516, such as sensors, valves, pumps, motors, computers or communication networks. In some embodiments, the I/O interface 1508 includes an antenna or a transceiver.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described here are to be taken as examples of embodiments. Elements and materials may be substituted for those illustrated and described here, parts and processes may be reversed or omitted, and certain features of the embodiments may be utilized independently, all as would be apparent to one skilled in the art after having the benefit of this description of the embodiments. Changes may be made in the elements described here without departing from the spirit and scope of the embodiments as described in the following claims. Headings used here are for organizational purposes only and are not meant to be used to limit the scope of the description.

It will be appreciated that the processes and methods described here are example embodiments of processes and methods that may be employed in accordance with the techniques described here. The processes and methods may be modified to facilitate variations of their implementation and use. The order of the processes and methods and the operations provided may be changed, and various elements may be added, reordered, combined, omitted, modified, and so forth. Portions of the processes and methods may be implemented in software, hardware, or a combination thereof. Some or all of the portions of the processes and methods may be implemented by one or more of the processors/modules/applications described here.

As used throughout this application, the word "may" is used in a permissive sense (meaning having the potential to), rather than the mandatory sense (meaning must). The words "include," "including," and "includes" mean including, but not limited to. As used throughout this application, the singular forms "a," "an," and "the" include plural referents unless the content clearly indicates otherwise. Thus, for example, reference to "an element" may include a combination of two or more elements. As used throughout this application, the term "or" is used in an inclusive sense, unless indicated otherwise. That is, a description of an element including A or B may refer to the element including one or both of A and B. As used throughout this application, the phrase "based on" does not limit the associated operation to being solely based on a particular item. Thus, for example, processing "based on" data A may include processing based at least in part on data A and based at least in part on data B, unless the content clearly indicates otherwise. As used throughout this application, the term "from" does not limit the associated operation to being directly from. Thus, for example, receiving an item "from" an entity may include receiving an item directly from the entity or indirectly from the entity (e.g., by way of an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

What is claimed is:

1. A method of developing a hydrocarbon reservoir, the method comprising:

determining, based on fracture data for the hydrocarbon reservoir obtained from a first well accessing the hydrocarbon reservoir, a two-dimensional (2D) fracture model comprising fracture lines representing locations of fractures in formation rock of the hydrocarbon reservoir;

determining, based on the lines of the 2D fracture model, a fracture density index (FDI) map comprising FDI values for cells of a 2D grid of cells representing the hydrocarbon reservoir, the determining of the FDI map comprising, for each cell of the grid of cells, determining a FDI value for the cell based on a proximity of the cell to the location of the fracture lines;

determining a circulation loss (CL) map comprising circulation loss values for the cells of the grid of cells representing the hydrocarbon reservoir, the determining of the circulation loss map comprising, for each cell of the grid of cells, determining a CL value for the cell based on a proximity of the cell to locations of circulation loss events in the hydrocarbon reservoir, wherein determining the CL value comprises:

determining a 2D circulation loss model comprising circulation loss points representing locations of circulation loss events observed during drilling of wells in the hydrocarbon reservoir, wherein the CL value for the cell is determined based on a proximity of the cell to the circulation loss points;

determining, based on the FDI map and the CL map, a correlation of fracture density index value to circulation loss values for the hydrocarbon reservoir;

determining, based on the correlation, a location in the hydrocarbon reservoir for a second well, the location having a fracture density less than the location of the first well and avoiding circulation losses; and drilling the second well at the location to access hydrocarbons in the hydrocarbon reservoir.

2. The method of claim 1, wherein the fracture lines of the 2D fracture model correspond to fracture planes of a 3D fracture model that represent natural fractures in the formation rock of the hydrocarbon reservoir.

3. The method of claim 1, wherein the FDI values for the cells are determined by way of a kernel density method.

4. The method of claim 1, wherein the FDI values for the cells are determined by way of a line density method.

5. The method of claim 1, wherein determining the correlation of fracture density index to circulation losses comprises fitting a line to a plot of FDI-CL value pairs for respective cells of the 2D grid of cells representing the hydrocarbon reservoir, wherein the correlation is defined by the line.

6. The method of claim 1, further comprising:

generating a FDI model indicating FDI values across the area of the reservoir corresponding to the grid of cells and locations of circulation loss events observed during drilling of wells in the hydrocarbon reservoir, wherein the location of the second well to be drilled is determined based on the FDI model.

7. A non-transitory computer readable storage medium comprising program instructions stored thereon that are executable by a processor to perform the following operations for developing a hydrocarbon reservoir:

determining, based on fracture data for the hydrocarbon reservoir obtained from a first well accessing the hydrocarbon reservoir, a two-dimensional (2D) fracture model comprising fracture lines representing locations of fractures in formation rock of the hydrocarbon reservoir;

determining, based on the lines of the 2D fracture model, a fracture density index (FDI) map comprising FDI values for cells of a 2D grid of cells representing the hydrocarbon reservoir, the determining of the FDI map comprising, for each cell of the grid of cells, determining a FDI value for the cell based on a proximity of the cell to the location of the fracture lines;

determining a circulation loss (CL) map comprising circulation loss values for the cells of the grid of cells representing the hydrocarbon reservoir, the determining of the circulation loss map comprising, for each cell of the grid of cells, determining a CL value for the cell based on a proximity of the cell to locations of circulation loss events in the hydrocarbon reservoir, wherein determining the CL value comprises:

determining a 2D circulation loss model comprising circulation loss points representing locations of circulation loss events observed during drilling of wells in the hydrocarbon reservoir, wherein the CL value for the cell is determined based on a proximity of the cell to the circulation loss points;

determining, based on the FDI map and the CL map, a correlation of fracture density index value to circulation loss values for the hydrocarbon reservoir;

determining, based on the correlation, a location in the hydrocarbon reservoir for a second well, the location having a fracture density less than the location of the first well and avoiding circulation losses; and controlling drilling of the second well at the location to access hydrocarbons in the hydrocarbon reservoir.

8. The medium of claim 7, wherein the fracture lines of the 2D fracture model correspond to fracture planes of a 3D fracture model that represent natural fractures in the formation rock of the hydrocarbon reservoir.

9. The medium of claim 7, wherein the FDI values for the cells are determined by way of a kernel density method.

10. The medium of claim 7, wherein the FDI values for the cells are determined by way of a line density method.

11. The medium of claim 7, wherein determining the correlation of fracture density index to circulation losses comprises fitting a line to a plot of FDI-CL value pairs for respective cells of the 2D grid of cells representing the hydrocarbon reservoir, wherein the correlation is defined by the line.

12. The medium of claim 7, the operations further comprising:

generating a FDI model indicating FDI values across the area of the reservoir corresponding to the 2D grid of cells and locations of circulation loss events observed during drilling of wells in the hydrocarbon reservoir, wherein the location of the second well to be drilled is determined based on the FDI model.

13. A hydrocarbon reservoir development system comprising:

a hydrocarbon reservoir control system comprising non-transitory computer readable storage medium comprising program instructions stored thereon that are executable by a processor to perform the following operations for developing a hydrocarbon reservoir:

determining, based on fracture data for the hydrocarbon reservoir obtained from a first well accessing the hydrocarbon reservoir, a two-dimensional (2D) fracture model comprising fracture lines representing locations of fractures in formation rock of the hydrocarbon reservoir;

determining, based on the lines of the 2D fracture model, a fracture density index (FDI) map comprising FDI values for cells of a 2D grid of cells representing the hydrocarbon reservoir, the determining of the FDI map comprising, for each cell of the grid of cells, determining a FDI value for the cell based on a proximity of the cell to the location of the fracture lines;

determining a circulation loss (CL) map comprising circulation loss values for the cells of the grid of cells representing the hydrocarbon reservoir, the determining of the circulation loss map comprising, for each cell of the grid of cells, determining a CL value for the cell based on a proximity of the cell to locations of circulation loss events in the hydrocarbon reservoir, wherein determining the CL value comprises:

determining a 2D circulation loss model comprising circulation loss points representing locations of circulation loss events observed during drilling of wells in the hydrocarbon reservoir, wherein the CL value for the cell is determined based on a proximity of the cell to the circulation loss points;

determining, based on the FDI map and the CL map, a correlation of fracture density index value to circulation loss values for the hydrocarbon reservoir;

determining, based on the correlation, a location in the hydrocarbon reservoir for a second well, the location having a fracture density less than the location of the first well and avoiding circulation losses; and controlling drilling of the second well at the location to access hydrocarbons in the hydrocarbon reservoir.

14. The system of claim 13, wherein the fracture lines of the 2D fracture model correspond to fracture planes of a 3D fracture model that represent natural fractures in the formation rock of the hydrocarbon reservoir.

15. The system of claim 13, wherein the FDI values for the cells are determined by way of a kernel density method or a line density method.

16. The system of claim 13, wherein determining the correlation of fracture density index to circulation losses comprises fitting a line to a plot of FDI-CL value pairs for respective cells of the 2D grid of cells representing the hydrocarbon reservoir, wherein the correlation is defined by the line.

17. The system of claim 13, the operations further comprising:

generating a FDI model indicating FDI values across the area of the reservoir corresponding to the grid of cells and locations of circulation loss events observed during drilling of wells in the hydrocarbon reservoir, wherein the location of the second well to be drilled is determined based on the FDI model.

* * * * *